US008543824B2

(12) United States Patent
Louch et al.

(10) Patent No.: US 8,543,824 B2
(45) Date of Patent: Sep. 24, 2013

(54) SAFE DISTRIBUTION AND USE OF CONTENT

(75) Inventors: John O. Louch, San Luis Obispo, CA (US); Aaron Sige, Santa Clara, CA (US); Maciej Stachowiak, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1192 days.

(21) Appl. No.: 11/409,276

(22) Filed: Apr. 20, 2006

(65) Prior Publication Data

US 2007/0101146 A1    May 3, 2007

Related U.S. Application Data

(60) Provisional application No. 60/730,956, filed on Oct. 27, 2005.

(51) Int. Cl.
*H04L 9/00* (2006.01)

(52) U.S. Cl.
USPC ........... 713/176; 713/155; 713/158; 713/172; 380/232; 726/26

(58) Field of Classification Search
USPC ................... 713/176, 155, 158, 172; 705/51; 380/232; 726/26
See application file for complete search history.

(56) References Cited

U.S. PATENT DOCUMENTS

| 4,752,893 | A | 6/1988 | Guttag et al. |
| 5,168,441 | A | 12/1992 | Ornaheim et al. |
| 5,289,574 | A | 2/1994 | Sawyer |
| 5,297,250 | A | 3/1994 | Leroy et al. |
| 5,351,995 | A | 10/1994 | Booker |
| 5,357,603 | A | 10/1994 | Parker |
| 5,388,201 | A | 2/1995 | Hourvitz et al. |

(Continued)

FOREIGN PATENT DOCUMENTS

| DE | 102 42 378 | 3/2004 |
| EP | 548586 | 6/1993 |

(Continued)

OTHER PUBLICATIONS

"Writing a Desk Accessory," Developer Connection, Apple Computer, Inc. Jul. 3, 1996, [online] [Retrieved on Jan. 3, 2006] Retrieved from the Internet URL:http://developer.apple.com/documentation/mac/devices/devices-16.html>, 3 pages.

(Continued)

*Primary Examiner* — Edward Zee
*Assistant Examiner* — Baotran N To
(74) *Attorney, Agent, or Firm* — Fish & Richardson P.C.

(57) ABSTRACT

A cryptographic hash of content (e.g., applications, documents, widgets, software, music, videos, etc.) is created and made available for distribution over a network (or by other means) as part of a ticket file. The ticket file can be cryptographically signed to ensure its authenticity. The ticket file and content can be downloaded separately (e.g., from different websites) to a user system (e.g., a computer, mobile phone, media player/recorder, personal digital assistant (PDA), etc.). The user system verifies the signature of the ticket file and the content hash to ensure that the content has not been compromised. The ticket file can include information relating to downloading the content (e.g., a Uniform Resource Identifier (URI)) and other meta-data (e.g., hash type, content information, public key, size, version, etc.).

15 Claims, 12 Drawing Sheets

(56) References Cited

U.S. PATENT DOCUMENTS

| | | | |
|---|---|---|---|
| 5,416,890 A | 5/1995 | Beretta | |
| 5,481,665 A | 1/1996 | Okada et al. | |
| 5,490,246 A | 2/1996 | Brotsky et al. | |
| 5,522,022 A | 5/1996 | Rao et al. | |
| 5,537,630 A | 7/1996 | Berry et al. | |
| 5,564,002 A | 10/1996 | Brown | |
| 5,564,022 A | 10/1996 | Debnath et al. | |
| 5,588,098 A | 12/1996 | Chen et al. | |
| 5,602,997 A | 2/1997 | Carpenter et al. | |
| 5,638,501 A | 6/1997 | Gough et al. | |
| 5,644,737 A | 7/1997 | Tuniman et al. | |
| 5,644,739 A | 7/1997 | Moursund | |
| 5,651,107 A | 7/1997 | Frank et al. | |
| 5,657,049 A | 8/1997 | Ludolph et al. | |
| 5,659,693 A | 8/1997 | Hansen et al. | |
| 5,659,694 A | 8/1997 | Bibayan | |
| 5,666,416 A * | 9/1997 | Micali | 713/158 |
| 5,671,343 A | 9/1997 | Kondo et al. | |
| 5,689,664 A | 11/1997 | Narayanan et al. | |
| 5,708,764 A | 1/1998 | Borrel et al. | |
| 5,710,884 A | 1/1998 | Dedrick | |
| 5,721,848 A | 2/1998 | Joseph | |
| 5,727,129 A | 3/1998 | Barrett et al. | |
| 5,727,135 A | 3/1998 | Webb et al. | |
| 5,731,819 A | 3/1998 | Gagne et al. | |
| 5,742,285 A | 4/1998 | Ueda | |
| 5,742,768 A | 4/1998 | Gennaro et al. | |
| 5,754,174 A | 5/1998 | Carpenter et al. | |
| 5,760,773 A | 6/1998 | Berman et al. | |
| 5,764,229 A | 6/1998 | Bennett | |
| 5,764,238 A | 6/1998 | Lum et al. | |
| 5,790,120 A | 8/1998 | Lozares et al. | |
| 5,793,376 A | 8/1998 | Tanaka et al. | |
| 5,796,402 A | 8/1998 | Ellison-Taylor | |
| 5,801,703 A | 9/1998 | Bowden et al. | |
| 5,809,230 A | 9/1998 | Pereira | |
| 5,835,692 A | 11/1998 | Cragun et al. | |
| 5,835,693 A | 11/1998 | Lynch et al. | |
| 5,838,316 A | 11/1998 | Arruza | |
| 5,838,906 A | 11/1998 | Doyle et al. | |
| 5,870,734 A | 2/1999 | Kao | |
| 5,877,741 A | 3/1999 | Chee et al. | |
| 5,877,762 A | 3/1999 | Young et al. | |
| 5,878,219 A | 3/1999 | Vance et al. | |
| 5,883,639 A | 3/1999 | Walton et al. | |
| 5,900,876 A | 5/1999 | Yagita et al. | |
| 5,903,896 A | 5/1999 | Waldman et al. | |
| 5,917,436 A | 6/1999 | Endo et al. | |
| 5,920,659 A | 7/1999 | Iverson et al. | |
| 5,929,852 A | 7/1999 | Fisher et al. | |
| 5,933,148 A | 8/1999 | Oka et al. | |
| 5,949,409 A | 9/1999 | Tanaka et al. | |
| 5,963,191 A | 10/1999 | Jaaskelainen, Jr. | |
| 5,978,579 A | 11/1999 | Buxton et al. | |
| 5,999,948 A | 12/1999 | Nelson et al. | |
| 6,005,568 A | 12/1999 | Simonoff et al. | |
| 6,006,231 A | 12/1999 | Popa | |
| 6,011,562 A | 1/2000 | Gagne et al. | |
| 6,023,708 A | 2/2000 | Mendez et al. | |
| 6,031,937 A | 2/2000 | Graffagnino | |
| 6,034,621 A | 3/2000 | Kaufman | |
| 6,045,446 A | 4/2000 | Ohshima | |
| 6,061,695 A | 5/2000 | Slivka et al. | |
| 6,075,543 A | 6/2000 | Akeley | |
| 6,128,010 A | 10/2000 | Baxter et al. | |
| 6,133,915 A | 10/2000 | Arcuri et al. | |
| 6,144,381 A | 11/2000 | Lection et al. | |
| 6,154,601 A | 11/2000 | Yaegashi et al. | |
| 6,160,552 A | 12/2000 | Wilsher et al. | |
| 6,166,748 A | 12/2000 | Van Hook et al. | |
| 6,167,533 A | 12/2000 | Potterveld et al. | |
| 6,188,399 B1 | 2/2001 | Voas et al. | |
| 6,191,797 B1 | 2/2001 | Politis | |
| 6,195,664 B1 | 2/2001 | Tolfa | |
| 6,211,890 B1 | 4/2001 | Ohba | |
| 6,232,957 B1 | 5/2001 | Hinckley | |
| 6,243,705 B1 | 6/2001 | Kucala | |
| 6,246,418 B1 | 6/2001 | Oka | |
| 6,253,122 B1 | 6/2001 | Razavi et al. | |
| 6,259,432 B1 | 7/2001 | Yamada et al. | |
| 6,266,053 B1 | 7/2001 | French et al. | |
| 6,266,430 B1 | 7/2001 | Rhoads | |
| 6,269,405 B1 | 7/2001 | Dutcher et al. | |
| 6,272,484 B1 | 8/2001 | Martin et al. | |
| 6,272,558 B1 | 8/2001 | Hui et al. | |
| 6,275,831 B1 | 8/2001 | Bodnar et al. | |
| 6,278,448 B1 | 8/2001 | Brown et al. | |
| 6,278,450 B1 | 8/2001 | Arcuri et al. | |
| 6,295,541 B1 | 9/2001 | Bodnar et al. | |
| 6,300,947 B1 | 10/2001 | Kanevsky | |
| 6,304,684 B1 | 10/2001 | Niczyporuk et al. | |
| 6,307,574 B1 | 10/2001 | Ashe et al. | |
| 6,310,621 B1 | 10/2001 | Gagne et al. | |
| 6,311,232 B1 | 10/2001 | Cagle et al. | |
| 6,313,851 B1 | 11/2001 | Matthews, III et al. | |
| 6,321,314 B1 | 11/2001 | Van Dyke | |
| 6,333,753 B1 | 12/2001 | Hinckley | |
| 6,344,855 B1 | 2/2002 | Fisher et al. | |
| 6,353,437 B1 | 3/2002 | Gagne | |
| 6,369,823 B2 | 4/2002 | Ohba | |
| 6,369,830 B1 | 4/2002 | Brunner et al. | |
| 6,396,520 B1 | 5/2002 | Ording | |
| 6,401,104 B1 | 6/2002 | LaRue et al. | |
| 6,411,274 B2 | 6/2002 | Watanabe et al. | |
| 6,411,301 B1 | 6/2002 | Parikh et al. | |
| 6,412,021 B1 | 6/2002 | Nguyen et al. | |
| 6,421,058 B2 | 7/2002 | Parikh et al. | |
| 6,424,348 B2 | 7/2002 | Parikh | |
| 6,430,576 B1 | 8/2002 | Gates et al. | |
| 6,434,744 B1 | 8/2002 | Chamberlain et al. | |
| 6,452,600 B1 | 9/2002 | Parikh et al. | |
| 6,456,290 B2 | 9/2002 | Parikh et al. | |
| 6,457,034 B1 | 9/2002 | Morein | |
| 6,466,218 B2 | 10/2002 | Parikh et al. | |
| 6,466,237 B1 | 10/2002 | Miyao et al. | |
| 6,469,714 B2 | 10/2002 | Buxton et al. | |
| 6,483,524 B1 | 11/2002 | Petchenkine et al. | |
| 6,484,261 B1 | 11/2002 | Wiegel | |
| 6,487,560 B1 | 11/2002 | LaRue et al. | |
| 6,489,963 B2 | 12/2002 | Parikh et al. | |
| 6,512,522 B1 | 1/2003 | Miller et al. | |
| 6,515,682 B1 | 2/2003 | Washington et al. | |
| 6,525,736 B1 | 2/2003 | Erikawa et al. | |
| 6,526,174 B1 | 2/2003 | Graffagnino | |
| 6,535,892 B1 | 3/2003 | LaRue et al. | |
| 6,536,041 B1 | 3/2003 | Knudson et al. | |
| 6,542,160 B1 | 4/2003 | Abgrall | |
| 6,542,166 B1 | 4/2003 | Washington et al. | |
| 6,544,295 B1 | 4/2003 | Bodnar | |
| 6,571,245 B2 | 5/2003 | Huang et al. | |
| 6,571,328 B2 | 5/2003 | Liao et al. | |
| 6,573,896 B1 | 6/2003 | Ribadeau Dumas et al. | |
| 6,577,317 B1 | 6/2003 | Duluk, Jr. et al. | |
| 6,580,430 B1 | 6/2003 | Hollis et al. | |
| 6,590,592 B1 | 7/2003 | Nason et al. | |
| 6,609,977 B1 | 8/2003 | Shimizu et al. | |
| 6,614,444 B1 | 9/2003 | Duluk, Jr. et al. | |
| 6,618,048 B1 | 9/2003 | Leather | |
| 6,636,214 B1 | 10/2003 | Leather et al. | |
| 6,639,595 B1 | 10/2003 | Drebin et al. | |
| 6,661,426 B1 | 12/2003 | Jetha et al. | |
| 6,664,958 B1 | 12/2003 | Leather et al. | |
| 6,664,962 B1 | 12/2003 | Komsthoeft et al. | |
| 6,664,986 B1 | 12/2003 | Kopelman et al. | |
| 6,674,438 B1 | 1/2004 | Yamamoto et al. | |
| 6,687,745 B1 | 2/2004 | Franco et al. | |
| 6,697,074 B2 | 2/2004 | Parikh et al. | |
| 6,707,462 B1 | 3/2004 | Peercy et al. | |
| 6,714,201 B1 | 3/2004 | Grinstein et al. | |
| 6,714,221 B1 | 3/2004 | Christie et al. | |
| 6,715,053 B1 | 3/2004 | Grigor | |
| 6,717,599 B1 | 4/2004 | Olano | |
| 6,724,403 B1 | 4/2004 | Santoro et al. | |
| 6,734,864 B2 | 5/2004 | Abgrall | |

| Patent No. | Date | Name |
|---|---|---|
| 6,738,804 B1 | 5/2004 | Lo |
| 6,741,242 B1 | 5/2004 | Itoh et al. |
| 6,742,042 B1 | 5/2004 | Holden et al. |
| 6,757,691 B1 | 6/2004 | Welsh et al. |
| 6,757,698 B2 | 6/2004 | McBride et al. |
| 6,760,046 B2 | 7/2004 | I'Anson et al. |
| 6,765,592 B1 | 7/2004 | Pletcher et al. |
| 6,788,318 B2 | 9/2004 | Chen |
| 6,792,616 B1 | 9/2004 | Jerding et al. |
| 6,795,060 B2 | 9/2004 | Rekimoto et al. |
| 6,806,892 B1 | 10/2004 | Plow et al. |
| 6,882,979 B1 | 4/2005 | Reay et al. |
| 6,892,360 B1 | 5/2005 | Pabla et al. |
| 6,906,720 B2 | 6/2005 | Emberling et al. |
| 6,910,000 B1 | 6/2005 | Yedidia et al. |
| 6,910,052 B2 | 6/2005 | Gates et al. |
| 6,911,984 B2 | 6/2005 | Sabella et al. |
| 6,918,091 B2 | 7/2005 | Leavitt et al. |
| 6,931,633 B1 | 8/2005 | Vazquez et al. |
| 6,944,829 B2 | 9/2005 | Dando |
| 6,993,721 B2 | 1/2006 | Rosin et al. |
| 7,007,242 B2 | 2/2006 | Suomela et al. |
| 7,016,011 B2 | 3/2006 | De Haan |
| 7,024,381 B1 | 4/2006 | Hastings et al. |
| 7,027,055 B2 | 4/2006 | Anderson et al. |
| 7,028,264 B2 | 4/2006 | Santoro et al. |
| 7,036,083 B1 | 4/2006 | Zenith |
| 7,050,955 B1 | 5/2006 | Carmel et al. |
| 7,076,730 B1 | 7/2006 | Baker |
| 7,082,577 B1 | 7/2006 | Brosnahan |
| 7,085,994 B2 | 8/2006 | Gvily |
| 7,107,546 B2 | 9/2006 | Coulthard |
| 7,127,473 B2 | 10/2006 | Agassi et al. |
| 7,127,713 B2 | 10/2006 | Davis et al. |
| 7,146,563 B2 | 12/2006 | Hesmer et al. |
| 7,174,512 B2 | 2/2007 | Martin et al. |
| 7,185,290 B2 | 2/2007 | Cadiz et al. |
| 7,191,399 B2 | 3/2007 | Ohtani et al. |
| 7,222,155 B1 | 5/2007 | Gebhardt et al. |
| 7,242,406 B2 | 7/2007 | Robotham et al. |
| 7,249,327 B2 | 7/2007 | Nelson et al. |
| 7,260,380 B2 | 8/2007 | Dietl et al. |
| 7,269,792 B2 | 9/2007 | Consolatti et al. |
| 7,281,202 B2 | 10/2007 | Croney et al. |
| 7,293,034 B2 | 11/2007 | Paya et al. |
| 7,315,848 B2 | 1/2008 | Pearse et al. |
| 7,328,435 B2 | 2/2008 | Trifon |
| 7,346,766 B2 | 3/2008 | Mackin et al. |
| 7,356,816 B2 | 4/2008 | Goodman et al. |
| 7,401,104 B2 | 7/2008 | Shah et al. |
| 7,426,687 B1 | 9/2008 | Schultz et al. |
| 7,503,010 B2 | 3/2009 | Chaudhri et al. |
| 7,523,401 B1 | 4/2009 | Aldridge |
| 7,530,026 B2 | 5/2009 | Chaudhri et al. |
| 7,546,543 B2 | 6/2009 | Louch et al. |
| 7,546,554 B2 | 6/2009 | Chiu et al. |
| 7,568,165 B2 | 7/2009 | Amadio et al. |
| 7,614,011 B2 | 11/2009 | Karidis et al. |
| 7,644,391 B2 | 1/2010 | Fisher et al. |
| 7,761,800 B2 | 7/2010 | Chaudhri et al. |
| 7,765,326 B2 | 7/2010 | Robbin et al. |
| 7,765,493 B2 | 7/2010 | Chickles et al. |
| 7,784,065 B2 | 8/2010 | Polivy et al. |
| 7,793,222 B2 | 9/2010 | Chaudhri et al. |
| 7,793,227 B2 | 9/2010 | Wada et al. |
| 7,793,232 B2 | 9/2010 | Chaudhri et al. |
| 7,802,246 B1 | 9/2010 | Kennedy et al. |
| 7,814,148 B2 | 10/2010 | Bell et al. |
| RE41,922 E | 11/2010 | Gough et al. |
| 7,873,908 B1 | 1/2011 | Varanasi et al. |
| 7,873,910 B2 | 1/2011 | Chaudhri et al. |
| 2001/0019338 A1 | 9/2001 | Roth |
| 2001/0030647 A1 | 10/2001 | Sowizral et al. |
| 2001/0035885 A1 | 11/2001 | Iron et al. |
| 2002/0013822 A1 | 1/2002 | West |
| 2002/0013832 A1* | 1/2002 | Hubbard .................. 709/220 |
| 2002/0049788 A1 | 4/2002 | Lipkin et al. |
| 2002/0054148 A1 | 5/2002 | Okada |
| 2002/0059594 A1 | 5/2002 | Rasmussen et al. |
| 2002/0065946 A1 | 5/2002 | Narayan |
| 2002/0066279 A1 | 6/2002 | Kiyomatsu |
| 2002/0067418 A1 | 6/2002 | I |
| 2002/0078453 A1 | 6/2002 | Kuo |
| 2002/0085037 A1 | 7/2002 | Leavitt et al. |
| 2002/0087632 A1 | 7/2002 | Keskar |
| 2002/0089526 A1 | 7/2002 | Buxton et al. |
| 2002/0093516 A1 | 7/2002 | Brunner et al. |
| 2002/0099678 A1 | 7/2002 | Albright et al. |
| 2002/0105548 A1 | 8/2002 | Hayton et al. |
| 2002/0112180 A1 | 8/2002 | Land et al. |
| 2002/0114466 A1* | 8/2002 | Tanaka et al. .................. 380/232 |
| 2002/0118217 A1 | 8/2002 | Fujiki |
| 2002/0120673 A1 | 8/2002 | Tolson et al. |
| 2002/0123739 A1 | 9/2002 | Haacke et al. |
| 2002/0129092 A1 | 9/2002 | Tolson et al. |
| 2002/0133508 A1 | 9/2002 | LaRue et al. |
| 2002/0140740 A1 | 10/2002 | Chen |
| 2002/0158902 A1 | 10/2002 | Hooker et al. |
| 2002/0171682 A1 | 11/2002 | Frank et al. |
| 2002/0174003 A1 | 11/2002 | Redmann et al. |
| 2002/0174055 A1 | 11/2002 | Dick et al. |
| 2002/0174181 A1 | 11/2002 | Wei |
| 2002/0180798 A1 | 12/2002 | Poor et al. |
| 2002/0186257 A1 | 12/2002 | Cadiz et al. |
| 2002/0196268 A1 | 12/2002 | Wolff et al. |
| 2003/0008661 A1 | 1/2003 | Joyce et al. |
| 2003/0008711 A1 | 1/2003 | Corbo |
| 2003/0009267 A1 | 1/2003 | Dunsky et al. |
| 2003/0018971 A1 | 1/2003 | McKenna, Jr. |
| 2003/0020671 A1 | 1/2003 | Santoro et al. |
| 2003/0032409 A1 | 2/2003 | Hutcheson et al. |
| 2003/0046316 A1 | 3/2003 | Gergic et al. |
| 2003/0061482 A1 | 3/2003 | Emmerichs |
| 2003/0067489 A1 | 4/2003 | Candy Wong et al. |
| 2003/0069904 A1* | 4/2003 | Hsu et al. .................. 707/204 |
| 2003/0076369 A1 | 4/2003 | Resner et al. |
| 2003/0080995 A1 | 5/2003 | Tenenbaum et al. |
| 2003/0097659 A1 | 5/2003 | Goldman |
| 2003/0101046 A1 | 5/2003 | Krasnov |
| 2003/0122787 A1 | 7/2003 | Zimmerman et al. |
| 2003/0123739 A1 | 7/2003 | Graffagnino |
| 2003/0125057 A1 | 7/2003 | Pesola |
| 2003/0146934 A1 | 8/2003 | Bailey et al. |
| 2003/0154239 A1 | 8/2003 | Davis et al. |
| 2003/0158975 A1 | 8/2003 | Frank et al. |
| 2003/0164862 A1 | 9/2003 | Cadiz et al. |
| 2003/0169306 A1 | 9/2003 | Makipaa et al. |
| 2003/0174136 A1 | 9/2003 | Emberling et al. |
| 2003/0174154 A1 | 9/2003 | Yukie et al. |
| 2003/0184552 A1 | 10/2003 | Chadha |
| 2003/0184584 A1 | 10/2003 | Vachuska et al. |
| 2003/0189597 A1 | 10/2003 | Anderson et al. |
| 2003/0191799 A1 | 10/2003 | Araujo et al. |
| 2003/0206195 A1 | 11/2003 | Matsa et al. |
| 2003/0208685 A1 | 11/2003 | Abdel-Rahman |
| 2004/0003402 A1 | 1/2004 | McKenna, Jr. |
| 2004/0012626 A1 | 1/2004 | Brookins |
| 2004/0032409 A1 | 2/2004 | Girard |
| 2004/0036711 A1 | 2/2004 | Anderson |
| 2004/0039934 A1 | 2/2004 | Land et al. |
| 2004/0054711 A1 | 3/2004 | Multer |
| 2004/0070629 A1 | 4/2004 | Seifert |
| 2004/0078814 A1 | 4/2004 | Allen |
| 2004/0090969 A1 | 5/2004 | Jerrard-Dunne et al. |
| 2004/0117831 A1 | 6/2004 | Ellis et al. |
| 2004/0119754 A1 | 6/2004 | Bangalore et al. |
| 2004/0125128 A1 | 7/2004 | Chang et al. |
| 2004/0179019 A1 | 9/2004 | Sabella et al. |
| 2004/0181580 A1 | 9/2004 | Baranshamaje |
| 2004/0183800 A1 | 9/2004 | Peterson |
| 2004/0194020 A1 | 9/2004 | Beda et al. |
| 2004/0205504 A1 | 10/2004 | Phillips |
| 2004/0212640 A1 | 10/2004 | Mann et al. |
| 2004/0215740 A1 | 10/2004 | Frank et al. |
| 2004/0223003 A1 | 11/2004 | Heirich et al. |
| 2004/0225955 A1 | 11/2004 | Ly |
| 2004/0230911 A1 | 11/2004 | Bent et al. |
| 2004/0237082 A1 | 11/2004 | Alcazar et al. |

| | | |
|---|---|---|
| 2004/0255253 A1 | 12/2004 | Marcjan |
| 2004/0261012 A1 | 12/2004 | Balsiger |
| 2004/0261037 A1 | 12/2004 | Ording et al. |
| 2004/0261038 A1 | 12/2004 | Ording et al. |
| 2005/0010419 A1 | 1/2005 | Pourhamid |
| 2005/0010634 A1 | 1/2005 | Henderson et al. |
| 2005/0021935 A1 | 1/2005 | Schillings et al. |
| 2005/0022139 A1 | 1/2005 | Gettman et al. |
| 2005/0039144 A1 | 2/2005 | Wada et al. |
| 2005/0057497 A1 | 3/2005 | Kawahara |
| 2005/0060655 A1 | 3/2005 | Gray et al. |
| 2005/0060661 A1 | 3/2005 | Kawahara et al. |
| 2005/0088447 A1 | 4/2005 | Hanggie et al. |
| 2005/0088452 A1 | 4/2005 | Hanggie et al. |
| 2005/0091571 A1 | 4/2005 | Leichtling |
| 2005/0091690 A1 | 4/2005 | Delpuch et al. |
| 2005/0114021 A1 | 5/2005 | Krull et al. |
| 2005/0144563 A1 | 6/2005 | Hough et al. |
| 2005/0144595 A1 | 6/2005 | McLean |
| 2005/0149458 A1 | 7/2005 | Eglen et al. |
| 2005/0160368 A1 | 7/2005 | Liu et al. |
| 2005/0168471 A1 | 8/2005 | Paquette |
| 2005/0168476 A1 | 8/2005 | Levene et al. |
| 2005/0172239 A1 | 8/2005 | Liu et al. |
| 2005/0183026 A1 | 8/2005 | Amano et al. |
| 2005/0193368 A1 | 9/2005 | Becker et al. |
| 2005/0198584 A1 | 9/2005 | Matthews et al. |
| 2005/0215310 A1 | 9/2005 | Boyd et al. |
| 2005/0221808 A1 | 10/2005 | Karlsson et al. |
| 2005/0229118 A1 | 10/2005 | Chiu et al. |
| 2005/0240857 A1 | 10/2005 | Benedict et al. |
| 2005/0243373 A1 | 11/2005 | Silverbrook et al. |
| 2005/0256940 A1 | 11/2005 | Henderson et al. |
| 2005/0278651 A1 | 12/2005 | Coe et al. |
| 2005/0282612 A1 | 12/2005 | Mathews |
| 2005/0283734 A1 | 12/2005 | Santoro et al. |
| 2006/0001652 A1 | 1/2006 | Chiu et al. |
| 2006/0004913 A1 | 1/2006 | Chong |
| 2006/0005207 A1 | 1/2006 | Louch et al. |
| 2006/0010394 A1 | 1/2006 | Chaudhri et al. |
| 2006/0015818 A1 | 1/2006 | Chaudhri et al. |
| 2006/0015846 A1 | 1/2006 | Fraleigh et al. |
| 2006/0031264 A1 | 2/2006 | Bosworth et al. |
| 2006/0036703 A1 | 2/2006 | Fulmer et al. |
| 2006/0036941 A1 | 2/2006 | Neil |
| 2006/0036969 A1 | 2/2006 | Guido et al. |
| 2006/0053384 A1 | 3/2006 | La Fetra et al. |
| 2006/0059437 A1 | 3/2006 | Conklin |
| 2006/0064422 A1 | 3/2006 | Arthurs et al. |
| 2006/0075033 A1 | 4/2006 | Bienstock et al. |
| 2006/0075106 A1 | 4/2006 | Hochmuth et al. |
| 2006/0075141 A1 | 4/2006 | Boxenhorn |
| 2006/0089840 A1 | 4/2006 | May |
| 2006/0095331 A1 | 5/2006 | O'Malley et al. |
| 2006/0107231 A1 | 5/2006 | Matthews et al. |
| 2006/0112123 A1 | 5/2006 | Clark et al. |
| 2006/0123356 A1 | 6/2006 | Sobeski et al. |
| 2006/0123359 A1 | 6/2006 | Schatzberger |
| 2006/0136843 A1 | 6/2006 | Shafron |
| 2006/0150118 A1 | 7/2006 | Chaudhri et al. |
| 2006/0156248 A1 | 7/2006 | Chaudhri et al. |
| 2006/0167704 A1 | 7/2006 | Nicholls et al. |
| 2006/0168536 A1 | 7/2006 | Portmann |
| 2006/0168538 A1 | 7/2006 | Stevens et al. |
| 2006/0174202 A1 | 8/2006 | Bonner |
| 2006/0197752 A1 | 9/2006 | Hurst et al. |
| 2006/0200775 A1 | 9/2006 | Behr et al. |
| 2006/0205517 A1 | 9/2006 | Malabuyo et al. |
| 2006/0206835 A1 | 9/2006 | Chaudhri et al. |
| 2006/0218499 A1 | 9/2006 | Matthews et al. |
| 2006/0230059 A1 | 10/2006 | Etgen et al. |
| 2006/0230272 A1* | 10/2006 | Lawrence et al. ............ 713/176 |
| 2006/0236257 A1 | 10/2006 | Othmer et al. |
| 2006/0248471 A1 | 11/2006 | Lindsay et al. |
| 2006/0253794 A1 | 11/2006 | Wilson |
| 2006/0271637 A1 | 11/2006 | McKeon et al. |
| 2006/0274086 A1 | 12/2006 | Forstall et al. |
| 2006/0277469 A1 | 12/2006 | Chaudhri et al. |
| 2006/0277481 A1 | 12/2006 | Forstall et al. |
| 2006/0282574 A1 | 12/2006 | Zotov et al. |
| 2007/0011026 A1 | 1/2007 | Higgins et al. |
| 2007/0038934 A1 | 2/2007 | Fellman |
| 2007/0044029 A1 | 2/2007 | Fisher et al. |
| 2007/0044039 A1 | 2/2007 | Amadio et al. |
| 2007/0061724 A1 | 3/2007 | Slothouber et al. |
| 2007/0074126 A1 | 3/2007 | Fisher et al. |
| 2007/0101279 A1 | 5/2007 | Chaudhri et al. |
| 2007/0101288 A1 | 5/2007 | Forstall et al. |
| 2007/0101291 A1 | 5/2007 | Forstall |
| 2007/0101297 A1 | 5/2007 | Forstall et al. |
| 2007/0101433 A1 | 5/2007 | Forstall et al. |
| 2007/0112739 A1 | 5/2007 | Burns et al. |
| 2007/0118813 A1 | 5/2007 | Forstall et al. |
| 2007/0130541 A1 | 6/2007 | Louch et al. |
| 2007/0162850 A1 | 7/2007 | Adler et al. |
| 2007/0203984 A2 | 8/2007 | AlHusseini et al. |
| 2007/0209013 A1 | 9/2007 | Ramsey et al. |
| 2007/0266093 A1 | 11/2007 | Forstall et al. |
| 2007/0273558 A1 | 11/2007 | Smith et al. |
| 2008/0016468 A1 | 1/2008 | Chambers et al. |
| 2008/0034309 A1 | 2/2008 | Louch et al. |
| 2008/0034314 A1 | 2/2008 | Louch et al. |
| 2008/0155453 A1 | 6/2008 | Othmer |
| 2008/0168367 A1 | 7/2008 | Chaudhri et al. |
| 2008/0168368 A1 | 7/2008 | Louch et al. |
| 2008/0168382 A1 | 7/2008 | Louch et al. |
| 2009/0005071 A1 | 1/2009 | Forstall et al. |
| 2009/0021486 A1 | 1/2009 | Chaudhri et al. |
| 2009/0024944 A1 | 1/2009 | Louch et al. |
| 2009/0044138 A1 | 2/2009 | Rudolph et al. |
| 2009/0125815 A1 | 5/2009 | Chaudhri et al. |
| 2009/0144644 A1 | 6/2009 | Chaudhri et al. |
| 2009/0158193 A1 | 6/2009 | Chaudhri et al. |
| 2009/0187841 A1 | 7/2009 | Chaudhri et al. |
| 2009/0228824 A1 | 9/2009 | Forstall et al. |
| 2009/0260022 A1 | 10/2009 | Louch et al. |
| 2009/0271724 A1 | 10/2009 | Chaudhri et al. |

FOREIGN PATENT DOCUMENTS

| | | |
|---|---|---|
| EP | 0694879 | 1/1996 |
| EP | 0 908 835 | 4/1999 |
| EP | 1 237 076 | 9/2002 |
| EP | 1383080 | 1/2004 |
| EP | 0972273 | 3/2004 |
| EP | 1 724 996 | 11/2006 |
| WO | WO 96/06401 | 2/1996 |
| WO | WO 97/07467 | 2/1997 |
| WO | WO 98/07112 | 2/1998 |
| WO | WO 98/45815 | 10/1998 |
| WO | WO 02/09039 | 1/2002 |
| WO | WO 03/023593 | 3/2003 |
| WO | WO 2004/027707 | 4/2004 |
| WO | WO 2004/076977 | 9/2004 |
| WO | WO 2006/012343 | 2/2006 |
| WO | WO 2006/020304 | 2/2006 |
| WO | WO 2006/119269 | 11/2006 |
| WO | WO 2009/012319 | 12/2009 |
| WO | WO 2009/012330 | 12/2009 |

OTHER PUBLICATIONS

Archive of "Objects, Images and Applets," W3C Recommendation, Feb. 10, 2003, [online] [Archived by http://archivve.org; Retrieved on Apr. 13, 2006] Retrieved from the Internet URL:http://web.archivve.org/web/20030210154019/http://www.w3.org/TR/REC-html1140/struct/objects.html, 21 pages.

Conner Borookshire D. et al. "Three-Dimensional Widgets" ACM 1992, 8 pages.

Http://en.wikipedia.org/wiki/Comparison_of_widget_engines, 2007, 6 pages.

http://en.wikipedia.org/wiki/Windows-Sidebar, 2007, 7 pages.

http://www.nat.org/dashboard/blog.php3 Dec. 2003, 31 pages.

International Search Report , PCT/US2005/008804, Jul. 27, 2005, 3 pages.

International Search Report and Writen Opinion, PCT/US2005/022152, Jul. 10, 2006, 8 pages.

Lammers, J.., et al., "Maya 4.5 Fundamentals: Particles,"New Riders Publishing, Jan. 14, 2003, 12 pages, [online] [retrieved on Feb. 17, 2007] Retrieved from ProQuest Safari Books Online on the Internet: <URL: http://proquest.safaribooksonline.com/0735713278>, 12 pages.

Snippet Software Inc. et al. "Corporate Portal Newsletter" Oct. 2000, 3 pages.

Snippet Software Inc. et al. "Snippets Software" Jun. 2001, 16 pages.

Stardock.com et al. "DesktopX Whitepaper and users Guide" 1999, 72 pages.

Tang, J.C. et al., "ConNexus to Awarenex: Extending Awareness to Mobile Users," SIGCHI '01, AMC, Mar. 31-Apr. 4, 2001, 8 pages.

Wardell, Brad, Konfabulator for Windows, Jan. 10, 2004; [online] Retrieved from the Internet Mar. 6, 2006] Retrieved from the Internet: URL:http://www.xpthemes.com/forums.asp?MID=19&CMID=19&AID=4472, 6 pages.

"About Merkitys"; [online] [Retrieved on Feb. 4, 2008]; Retrieved from the Internet, URL: http://meaning.3xi.org/; 3 pages.

"Advanced Digital Photo Solutions"; GeoSpatial Experts; [online] [Retrieved on Feb. 4, 2008]; Retrieved from the Internet, URL: http://www.geospatialexperts.com/productadv.html; 4 pages.

"Comarison of widget engines", http://en.wikipedia.org/wiki/Comparison_of_widget_engines, 2007, 6 pages.

"Coolsmartphone"; [online] [Retrieved on Apr. 13, 2006]; Retrieved from the Internet, URL: http://www.coolsmartphone.com/article569.html; 57 pages.

"Dashboard Blog", Dec. 2003, Retrieved from the Internet on May 11, 2007 <URL:http://www.nat.org/dashboard/blog.php3> 31pages.

"Garmin hits iphone directly with nuvifone"; [online] [Retrieved on Mar. 17, 2008]; Retrieved from the Internet, URL: http://www.electronista.com/print/50764; 3 pages.

"Garmin® nüvifone™ Takes Personal Navigation and Communication to the Next Level"; Garmin International; [online] [Retrieved on Mar. 17, 2008]; Retrieved from the Internet, URL: http://www8.garmin.com/pressroom/mobile/013008.html; 3 pages.

"Go View Map Save to Favorites Cancel"; [online] [Retrieved on Feb. 4, 2008]; Retrieved from the Internet, URL: http://www8.garmin.com/buzz/nuvifone/m/g/sc-geotag-lg.jpg; 1 page.

"GPS Blogging Phones"; [online] [Retrieved on Apr. 5, 2006] Retrieve from the Internet, URL: http://www.dailywireless.org/modules.php?name=News&file=article&sid=4613; 3 pages.

"International Roaming Guide—Personal Experience(s) from Customer and Community Member"; [online] [Retrieved Jun. 26, 2006] Retrieved from the Internet <URL: http://forums.cingular.com/cng/board/message?board.id=1185; 6 pages.

"MOREnet Dialing Plan: PSTN and IP Network Integration for H.323, H320 VoIP and Public Voice Networks", [online] [Retrieved on Jan. 11, 2008] Retrieved from the Interent < URL: http://www.more.net/technical/research/dialplan/index.html, 12 pages.

"New Improved Panoramio—Geo Photo Sharing"; Google Earth Blog; [online] [Retrieved on Feb. 5, 2008]; Retrieved from the Internet, URL: http://www.gearthblog.com/blog/archives/2006/06/new_improved_pa.html, 1 page.

"Snap, Map and Share Your World"; IsWhere by Red Hen Systems; [online] [Retrieved on Jun. 3, 2008]; Retrieved from the Internet, URL: http://www.redhensystems.com/products/multimedia_mapping_software/iswhere/default.asp?sm=2; 1 page.

"Windows Sidebar", Wikipedia, Retrieved from the Internet, <URL:http://en.wikipedia.org/wiki/Windows-Sidebar>, 2007, 7 pages.

"Convert just about Anything to Anything else", OnlineConversion.com, Aug. 2000, [online] [Retrieved on Jun. 22, 2008] Retrieved from the Internet, URL:http://web.archive.org/web/200000815055422/http://www.onlineconversion.com>.

"Writing a Desk Accessory," Developer Connection, Apple Computer, Inc. Jul. 3, 1996, [online] [Retrieved on Jan. 3, 2006] Retrieved from the Internet URL: http://developer.apple.com/documentation/mac/devices/devices-16.html>, 3 pages.

Akeley, Kurt, and Hanrahan, Pat, "Real-Time Graphics Architecture," http://www.grahics.stanford.edu/courses/cs448a-01-fall, the OpenGL Graphics System, CS448 Lecture 15, Fall, 2001, pp. 1-20.

Altman, R.B., "Visual Quickstart Guide Power Point 2000/98, Applying Preset Animations," ProQuest Safari Books, Peachpit Press, May 7, 1999, 7 pages [online] Retrieved from the Internet: <URL: http://proquest.safaribooksonline.com/0201354411>.

Archive of "Objects, Images and Applets," W3C Recommendation, Feb. 10, 2003, [online] [Archived by http://archivve.org; Retrieved on Apr. 13, 2006] Retrieved from the Internet URL:http://web.archivve.org/web/20030210154019/http://www.w3.org/TR/REC-htm1140/struct/objects.html, 21 pages.

Beier et al., "The bull's-eye: a framework for web application user interface design guidelines", Proceedings of the Sigchi Conference on Human Factors in Computing Systems, Apr. 2003, pp. 489-496.

Cadiz, JJ et al., "Slideshow: Providing Peripheral Awareness of Important Information," Technical Report MSR-TR-2001-83, (Sep. 14, 2001), 9 pages. Microsoft Corporation, Redmond, WA.

Carey et al., "Integrating Widget Design Knowledge with User Interface Toolkits", Proceedings of the Fifth International Workshop on Computer-Aided Software Engineering, Jul. 1992, pp. 204-212.

Chen et al., "The Model of Optimum Route Selection in Vehicle Automatic Navigation System Based on Unblocked Reliability Analyses", Intelligent Transportation Systems, 2003, Proceedings, IEEE (2003), vol. 2, Oct. 12-15, 2003, pp. 975-978.

Chinese Notification of First Office Action, Chinese Patent Application No. 200580016349.3, Jul. 25, 2008, 21 pages.

Conner et al. "Three-Dimensional Widgets" ACM 1992, pp. 183-231.

Elliott, Conal, "Programming Graphics Processors Functionally," Proceedings of the 2004 Haskell Workshop, Sep. 22, 2004. 11 pages.

Fried, Ina, "Developer Calls Apple's Tiger a Copycat," CNET News.com, Jun. 28, 2004 [online] Retrieved on Jul. 1, 2004] Retrieved from the Internet URL:http://zdnet.com.com/2102-1104_2-250692.html?tag=printthis, 2 pages.

Fried, Ina, "For Apple's Tiger, the Keyword is Search", CNET News.com, Jun. 28, 2004 [online] Retrieved on Jul. 1, 2004] Retrieved from the Internet URL:http://zdnet.com.com/2102-1103_2-5250346.html?tag=printthis, 2 pages.

Guber, John et al., "Dashboard vs. Konfabulator", Jun. 2004, 9 pages.

Haeberli, P. et al., "The Accumulation Buffer: Hardware Support for High-Quality Rendering," Computer Graphics, Aug. 1990, pp. 309-318, vol. 24, No. 4.

Han; "Bi-manual, multi-point, and multi-user interactions on a graphical interaction surface"; Mutli-Touch Interaction Research; [online] [Retrieved on Apr. 13, 2006]; Retrieved from the Internet, URL: http://mrl.nyu.edu/~jhan/ftirtouch/; 4 pages.

Helal et al., "Drishti: An Integrated Navigation System for Visually Impaired and Disabled", Fifth International Symposium on Wearable Computers (ISWC'01), IEEE, 2001, pp. 149-156.

International Search Report, PCT/US2005/008804, Jul. 27, 2005, 3 pages.

International Search Report and Written Opinion, PCT/US2005/022152, Jul. 10, 2006, 8 pages.

International Search report, PCT/US2005/008805, Aug. 8, 2005, 3 pages.

Invitation to Pay Additional Fees(Form PCT/ISA/206) and Communication Relating to the Results of the Partial International Search (PCT/ISA/206 (Annex)) for PCT/US2007/077441; dated Jan. 28, 2008, 8 pages.

Invitation to Pay Additional Fees(Form PCT/ISA/206) and Communication Relating to the Results of the Partial International Search (PCT/ISA/206 (Annex)) for PCT/US2008/050295; dated Jul. 29, 2008.

Konfabulator, "Cupertino, Start your Photocopiers!," [online] [Retrieved on Jul. 1, 2004] Retrieved from the Internet <URL: http://www.konfabulator.com>, 1 page.

Konfabulator, "Konfabulator & Widget Basics," [online] [Retrieved on Jul. 1, 2004] Retrieved from the Internet <URL: http://www.konfabulator.com/info/basics.html>, 3 pages.

Konfabulator, "Screenshots," [online] [Retrieved on Jul. 1, 2004] Retrieved from the Internet <URL: http://www.konfabulator.com/info/screenshots.html>, 2 pages.

Konfabulator, "What is Konfabulator?," [online] [Retrieved on Jul. 1, 2004] Retrieved from the Internet <URL: http://www.konfabulator.com/info/, 3 pages.

Lammers, J.., et al., "Maya 4.5 Fundamentals: Particles,"New Riders Publishing, Jan. 14, 2003, 12 pages, [online] [retrieved on Feb. 17, 2007] Retrieved from ProQuest Safari Books Online on the Internet: <URL: http://proquest.safaribooksonline.com/0735713278>, 12 pages.

Microsoft Corporation, "Microsoft® Windows™ Graphical Environment User's Guide", Version 3.0 for MS-DOS® or PC-DOS Operating System, 1990, Document No. SY06851-0290, pp. Cover-vii, 15-75, 315-353.

Microsoft Corporation, "User's Guide Microsoft® Windows™and MS-DOS® 6", 1993, pp. Cover-xvi, 112-121.

Notification of Transmittal of the International Search Report and the Written Opinion of the International Searching Authority, PCT/US2005/022579, 15 pages.

Notification of Transmittal of the International Search Report and the Written Opinion of the International Searching Authority, PCT/US2007/077441, May 8, 2008; 17 pages.

Nvidia, "CG—Teaching Cg," Power Point Presentation, Author and date unknown, pp. 1-16.

Puder, A., "Extending Desktop Applications to the Web," ACM International Conference Proceedings Series, Proceedings of the Jun. 2004 International Symposium on Information and Communication Technologies, 2004, vol. 90, 6 pages.

Rist et al., "Customizing Graphics for Tiny Displays of Mobile Devices", Personal and Ubiquitous Computing, 2002, pp. 260-268, vol. 6.

Rochkind, M. et al., "Common Elements in Today's Graphical User Interfaces: The Good, the Bad, and the Ugly," Interchi '93, AMC, Apr. 24-29, 1993, pp. 470-473.

Segal, Mark and Akeley, Kurt, "The OpenGL Graphics System: A Specification (Version 1.5)," Copyright 1992-2003 Silicon Graphics, Inc., Oct. 30, 2003, 334 pages.

Shantzis, Michael A., "A Model for Efficient and Flexible Image Computing," Computer Graphics Proceedings, Annual Conference Series, Orlando, Florida, Jul. 24-29, 1994, pp. 147-154.

Shiozawa, Hidekazu et al., "Perspective Layered Visualization of Collaborative Workspaces," Proceedings of the International ACM SIGGROUP conference on Supporting Group Work Publisher, Nov. 1999, 5 pages.

Snippet Software, "Product Spotlight Non-browser based portal solution from Snippets Software", Corporate Portal Newsletter, Oct. 2000, vol. 1, No. 10, 3 pages.

Snippet Software, "Snippets Software Platform", Retrieved from the Internet on Jun. 11, 2001 <URL:http://www.snippets.com/products/>.

Snippets Software et al., "Products Overview", Feb. 2002, [online] [Retrieved on Feb. 5, 2008] Retrieved from the Internet URL: http://web.archive.org/web/20020206061508/http://www.snippets.com/products/>.

Staples, Loretta, "Representation in Virtual Space: Visual Convention in the Graphical User Interface," Proceedings of the SIGCHI Conference on Human Factors in Computing Systems, Apr. 1993. http://www.nat.org/dashboard/blog.php3 Dec. 2003, 8 pages.

Stardock et al., "DesktopX General Guide," Aug. 2000, [online] [Retrieved on Jan. 31, 2008] Retrieved from the Internet URL:http://www.stardock.com/products/desktopx/docs/.

Stardock et al., "DesktopX Tutorial", Aug. 2000, [online] [Retrieved on Jan. 31, 2008] Retrieved from the Internet URL:http://www.stardock.com/products/desktopx/tutorial.html.

Stardock et al., "DesktopX WhitePaper", Aug. 2000, [online] [Retrieved on Jan. 31, 2008] Retrieved from the Internet <URL:http://www.stardock.net/media/whitepaper_desktopx.html.

Stardock et al., "The User Guide—Version 2", DesktopX 2000.

Stardock et al., "What Can It Do? Making Objects", DesktopX Tutorial, 2001, [online] [Retrieved on Apr. 11, 2008] Retrieved from the Internet URL:http://web.archive.org/web/2001101922285/http://www.stardock.com/products/desktopx/.

Stardock News, DesktopX User Manual On-line:, 1999, 2003 [online] [Retrieved from the Internet on May 11, 2007] <URL:http://www.stardock.comnewsitem.asp?id=538>.

Stardock News/Media/Press.

Stardock, "DesktopX Whitepaper and users Guide" Retrived from the Internet <URL:http://www.stardock.net/media/whitepaper_desktopx.html>, 1999, 72 pages.

Tang, J.C. et al., "ConNexto Awarenex: Extending Awareness to Mobile Users," SIGCHI '01, AMC, Mar. 31-Apr. 4, 2001, 8 pages.

Ullenboom, C., "Java is auch eine Insel," 2003, [online] [Retrieved on Apr. 13, 2006] Retrieved from the Internet URL: http://www.galileocomputing.de/openbook/javainse12//java_140000.htm#Xxx998138, 3 pages.

Van Gelder, Allen, and Kwansik, Kim, "Direct Volume Rendering with Shading via Three-Dimensional Textures," Computer Science Dept., Univ. of California, Santa Cruz, CA 95064, 9 pages.

Wardell, "Konfabulator for Windows", Jan. 10, 2004, Retrieved from the Internet on Mar. 6, 2006, URL: http://www.xpthemes.com/forums.aps?MID=19&CMID=19&AID=4472, 6 pages.

Partial International Search Report, dated May 15, 2009, issued in International Application No. PCT/US2008/050047.

Invitation to Pay fees and Partial International Search Report, dated May 8, 2009, issued in PCT/US2008/050038.

Archive of BabelFish.com Inc., Oct. 2003, [online] [Archived by http://archive.org on Oct. 2, 2003; retrieved on Dec. 8, 2008] Retrieved from the Internet URL: <http://web.archive.org/web/20031002115902/www.babelfish.com/en/index.html>.

Starfish Software Introduces Starfish Internet Sidekick; Starfish Internet Sidekick is the best way for Internet users to manage their calendar, contacts and communications, Busienss Wire, Sep. 23, 1996, [online] [Retrieved on Dec. 8, 2008] Retrieved from the Internet URL: <http://findarticles.com/articles/mi_mOEIN/is_1996_Sept_23/ai_18704672?tag=rel.resl>.

Archive of www.gigaplex.com, Lazar Productions, Nov. 1996, [online] [Archived by http://archive.org on Nov. 5, 1996; retrieved on Dec. 8, 2008] Retrieved from the Internet URL: <http://web.archive.org/web/19961105081827/www.gigaplex.com/>.

Archive of movies.com, Jan. 2002, [online] [Archived by http://archive.org on Jan. 18, 2002; Retrieved on Dec. 8, 2008] Retrieved from the Internet URL: <http://www.archive.org/web/20020118102516/movies.go.com>.

Baratz et al., "DesktopX 3/1", Ars Technica, Nov. 17, 2005, [online] [Retrieved on Aug. 1, 2008] Retrieved from the Internet URL: <http://arstechnica.com/reviews/apps/desktopx/ars.>.

Siracusa et al., "Mac OA 10.4 Tiger: Dashboard", Apr. 28, 2005, [online] [Retrieved on Aug. 1, 2008] Retrieved from the Internet URL: <http://arstechnica.com/reviews/os/macosz-10-4.ars/17>.

Wardell et al. "Apple's Dashboard vs. Konfabulator vs. DesktopX", Skinning the frog, Jul. 1, 2004, [online] [Retrieved on Aug. 1, 2008] Retrieved from the Internet URL: <http://frogboy.joeuser.com/article/19800>.

Thomas et al., "Animating Widgets in the InterViews Toolkit", Lecture Notes in Computer Science, pp. 26-44, 1995.

VMWare, "VMWare Workstation User's Manual", 2002, pp. 12-13.

JavaBoutique, Oct. 1, 2002. Available at: <http://javaboutique.internet.com/utilities/counter.html>.

Forstall et al., U.S. Appl. No. 12/469,555, filed May 20, 2009.

"Coolsmartphone"; Apr. 17, 2006, [online] [Retrieved on Sep. 11, 2009]; Retrieved from the Internet, URL: http://www.web.archive.org/web/20060417080115/http://www.coolsmartphone.com/article569.html ; 24 pages.

"Desktop Sidebar", [online] [Retrieved on May 11, 2007] Retrieved from the Internet URL: http://web.archive.org/web/20040101160831/http://www.desktopsidebar.com/; 5 pages.

Garmin® nüvifone™ Images, [online] [Retrieved from the Internet on Feb. 4, 2008], URL: http://www8.garmin.com/buzz/nuvifone/media_gallery.jsp; 2 pages.

"Inter-widget communication?", [online] [Retrieved on Jun. 5, 2009], Retrieved from the Internet URL: http://www2.konfabulator.com/forums/lofiversion/index.php/t125.html; 3 pages.

"Portlet Communication: What is application scope, anyway?", Sep. 18, 2002, [online]; Retrieved from the Internet at URL: http://wwwcoderanch.com/t/203244/Portals-Portlets/java/Portlet-Communication-What-application-scope; 3 pages.

"Portlet-to-portlet communication between JSR 168 portlets on public pages", Apr. 5, 2006, [online]; Retrieved from the Internet URL: http://www.ibm.developerworks/websphere/library/techarticles/0604_scott/0604_scott.html; 9 pages.

Akeley, "Cg—Teaching Cg," Power Point Presentation, NVIDIA Corporation, 2002; 1 page.

International Search Report and Written Opinion, dated Sep. 3, 2009, issued in International Application No. PCT/US2008/050047; 17 pages.
Konfabulator, "Konfabulator & Widget Basics—A Refresher Course in Widgetology", [online] [Retrieved on Jun. 5, 2009], Retrieved from the Internet URL: http://web.archive.org/web/20050811020610/http://konfabulator.com/basics; 16 pages.
Stardock, "Gallactica Civilization: Dread Lords—User Manual", Stardock Entertainment © 2006; 65 pages.
Stardock, "Your Edge in Software", [online] [Retrieved on May 11, 2007]; Retrieved from the Internet URL: http://www.stardock.com/media.asp?cmd=mediakits; 56 pages.
Van Gelder et al., "Direct Volume Rendering with Shading via Three-Dimensional Textures," Computer Science Dept., Univ. of California, Santa Cruz, CA 95064, Jul. 19, 1996; 17 pages.
"Sidekick", [Online] [Retrieved on Oct. 12, 2009] Retrieved from the Internet at URL: http://en.widipedia.org/wiki/Sidekick; 5 pages.
International Search Report and Written Opinion, dated Oct. 16, 2009, issued in International Application No. PCT/US2008/070217.
Caceres et al., "Widget 1.0 Requirements", [Online] [Downloaded on Sep. 10, 2009]; Retrieved from the Internet at URL: http://www.w3.org/TR/2007/WD-widgets-reqs-20070705; 30 pages.
Louche et al., "Multidimensional Widgets", U.S. Appl. No. 12/612,301, filed Nov. 4, 2009, 45 pages.
Warren, "The VMware Workstation 5 Handbook", Jun. 2005, Course Technology PTR, 50 pages.
Javaboutique. Oct. 8, 2008. Available at: http://web.archive.org/web/20021208051951/http://javaboutique.internet.com/utilities/counter.html.
Bauer, "Transparent User Modeling for a Mobile Personal Assistant," LWA 2004: Lernen-Wissensentdecking-Adaptivitat, [Online] Oct. 6, 2004, pp. 3-8, Berlin Retrieved from the Internet: URL:http://www.dfki.de/specter/Docs/Bauer04.pdf> [retrieved on Sep. 15, 2009].
TellWidget, Sep. 5, 2005, 3 pages.
Bauer and Deru, "Motion-Based Adaptation of Information Services for Mobile Users," Lecture Notes in Computer Science, Aug. 19, 2005, Retrieved from the Internet, URL: http://www.springerlink.com/content/1wdvxw9ervxa44f9/fulltext.pdf>, [retrieved on Sep. 15, 2009], 6 pages.
Lieberman and Selker, "Agents for the User Interface," Handbook of Agent Technology, 2003, pp. 1-20, Retrieved from the Internet, URL: http://web.media.mit.edu/{lieber/Publications/Agents_for_UI.pdf> [retrieved on Sep. 15, 2009].
Horvitz et al., "The Lumiere Project: Bayesian User Modeling for Inferring the Goals and Needs of Software Users," Fourteenth Conference on Uncertainty in Artificial Intelligence, Madison, WI, Jul. 1998, Morgan Kaufman Publishers, pp. 256-265.
Dashboard Widgets, Jun. 8, 2005, 2 pages.
Discovering the Dashboard, Apr. 28, 2005, 10 pages.
How-To Keeping Multiple Dashboard Widgets on the Desktop, Apr. 30, 2005, 8 pages.
Konfabulator 1.7—Now with Konspose and Unicode Support!, Jun. 25, 2004, 11 pages.
Konspose and Activation, Jun. 30, 2004, 2 pages.
Konspose Speed, Sep. 24, 2004, 3 pages.
Macworld Unveils Dashboard Widget, Aug. 30, 2005, 5 pages.
Dashboard vs Konfabulator, Apr. 25, 2005, 31 pages.
Konspose Only—what's the deal?, Oct. 18, 2005, 2 pages.
Widgets only when needed, Jul. 8, 2004, 3 pages.
Hide all Widgets on Desktop, Oct. 12, 2004, 5 pages.
Adam Baratz, Konfabulator 2.0 Before there was Dashboard, there was Konfabulator. While Apple was wokring on . . . , Jun. 22, 2005, 9 pages.
A Better Konspose Background, Aug. 10, 2004, 1 page.
Konfabulator Release Notes, Jul. 9, 2004, 3 pages.
Yes . . . another NEWBIE in need of HELP! How do I set HOTKEYS?, Jul. 25, 2004, 2 pages.
Rodriguez et al., "IBM WebSphere Portal V5 a Guide for Portlet Application Development," Feb. 1, 2004, 48 pages.
Inter-Widget Messaging!, I want my widgets to work together!, Feb. 7, 2005, 4 pages.
eHow, VMWare, http://www.ehow.com/how_6368_minimize-window.html, "How to Minimize a Window," Jun. 2004.
Grundy, "An environment for developing adaptive, multi-device user interfaces," AUIC '03 Proceedings of the Fourth Australasian User Interface Conference on User Interfaces, 2003, vol. 18, Australian Computer Society, Inc., Darlinghurst, Australia.

* cited by examiner

SAFE DISTRIBUTION AND USE OF CONTENT

RELATED APPLICATIONS

This patent application claims the benefit of priority from jointly owned and U.S. Provisional Patent Application No. 60/730,956, for "Widget Security," filed Oct. 27, 2005, which provisional patent application is incorporated by reference herein in its entirety.

The subject matter of this patent application is related to the following jointly owned and co-pending U.S. patent applications:

U.S. patent application Ser. No. 10/877,968, for "Unified Interest Layer For User Interface," filed Jun. 25, 2004;

U.S. patent application Ser. No. 11/282,110, for "Preview Including Theme Based Installation of User Interface Elements In A Display Environment," filed Nov. 16, 2005; and U.S. Provisional Patent Application No. 60/737,899, for "Management of User Interface Elements In A Display Environment," filed Nov. 18, 2005.

Each of these patent applications is incorporated by reference herein in its entirety.

TECHNICAL FIELD

The disclosed implementations relate generally to system security.

BACKGROUND

Users frequently download content (e.g., documents, applications, software, files, widgets, ring tones, music, eBooks, videos, etc.) from websites and install the content on computer systems and other electronic devices (e.g., media players/recorders, mobile phones, game consoles, etc.). Many users assume that content downloaded and installed from a website is safe to install and use. Some websites, however, provide a user interface for browsing and selecting content for download, but redirect the user to a distribution server at another website to download the content. In some cases, the redirecting website neither monitors nor controls the distribution website. Due to this lack of oversight, the authenticity of the downloaded content cannot be guaranteed.

SUMMARY

A cryptographic hash of content (e.g., applications, documents, widgets, software, music, videos, etc.) is created and made available for distribution over a network or by other means (e.g., distributed on a CD ROM, preinstalled on a user system, etc.). The hash can be placed in a ticket file which can be cryptographically signed to ensure its authenticity. The ticket file and content can be downloaded separately (e.g., from different websites) to a user system (e.g., a computer, mobile phone, media player/recorder, personal digital assistant (PDA), etc.). The user system verifies the signature of the ticket file and the content hash to ensure that the content has not been compromised. The ticket file can include information relating to downloading the content (e.g., a Uniform Resource Identifier (URI)) and other meta-data (e.g., hash type, content information, public key, size, version, etc.).

In some implementations, a method of distributing content includes: creating a cryptographic hash of at least a portion of the content; creating a ticket file including the cryptographic hash; and distributing the ticket file to a user system.

In some implementations, a method of downloading content from a network includes: sending a request for content to a content aggregator site; and receiving from the content aggregator site a digitally signed ticket file including a first cryptographic hash of at least a portion of content.

Other implementations are disclosed which are directed to systems, methods, computer-readable mediums, devices and user interfaces.

DETAILED DESCRIPTION

Content Download Environment

Figure 1:
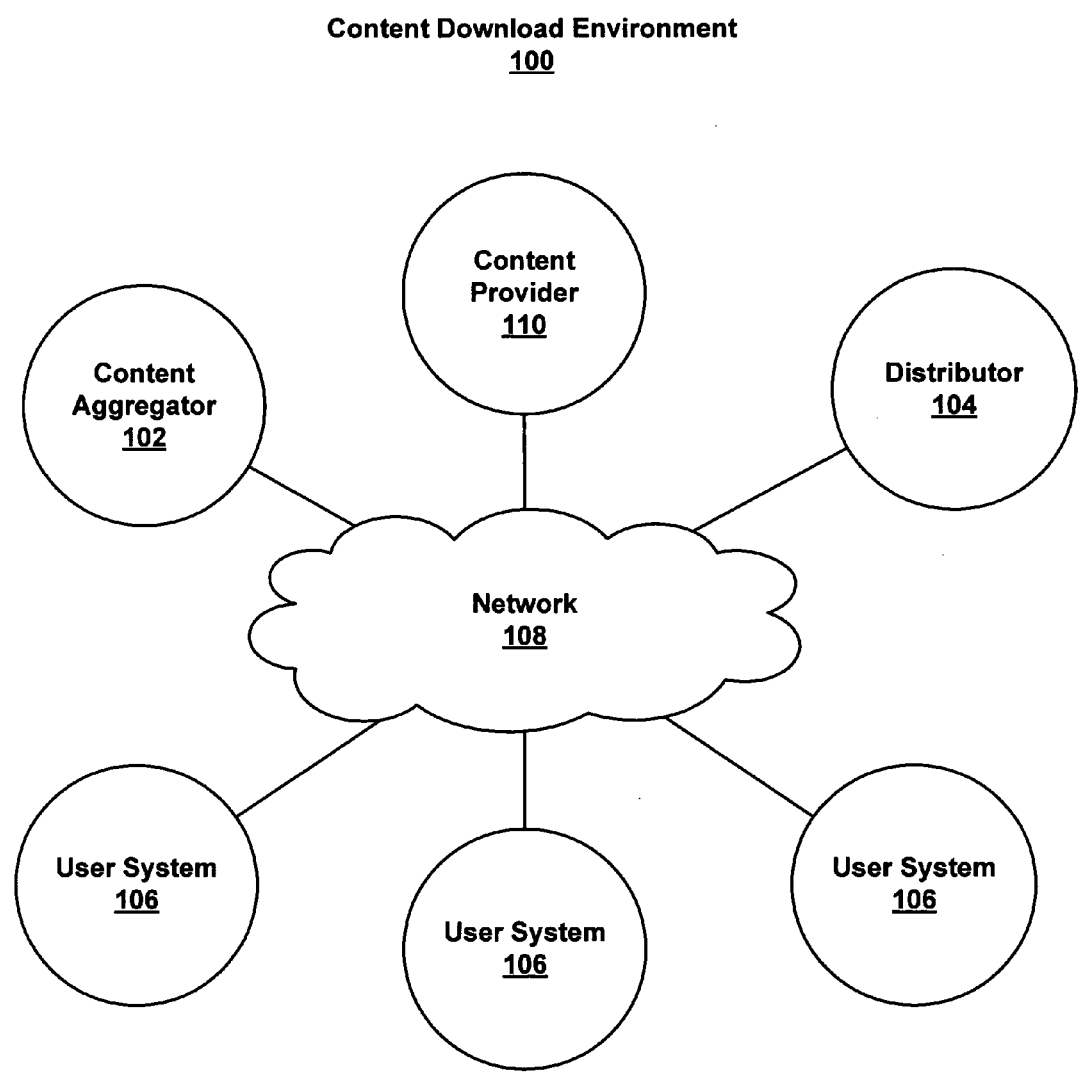
FIG. 1 is a block diagram of an exemplary content download environment.

FIG. 1 is a block diagram of an exemplary content download environment 100. In some implementations, the content download environment 100 includes a content aggregator 102, one or more content distributors 104, one or more user systems 106 and one or more content providers 110. The content aggregator 102, content distributors 104, user systems 106 and content providers 110 can communicate using communication connections, including, for example, a network 108 (e.g., the Internet, Internet, LAN, wireless network, etc.). In some implementations, the content aggregator 102 and the content distributors 104 are websites in the World Wide Web. Although the content download environment 100 is described as a network, the safe download features described herein can apply to other distribution mediums (e.g., CD ROMs, hard disks, Flash drives, etc.)

The content aggregator 102 aggregates content-related information from the content providers 110 and redirects user systems 106 to distributors 104 where the content can be downloaded. For example, the content aggregator 102 can be a trusted website that provides user systems 106 with access to a repository of content-related information and also provides mechanisms (e.g., links) for downloading content. In some implementations, a web server at the trusted website (e.g., Apache HTTP server) serves web pages that allow user systems 106 to navigate the repository with a browser and to select content for download. When content is selected for download, the aggregator 102 provides the user system 106 with information related to downloading the content from a distributor 104 (e.g., a Uniform Resource Identifier (URI)). In some implementations, the content aggregator 102 does not monitor or control the distributor 104, and accordingly, there is a risk that user systems 106 will download content that has been compromised. For example, a malicious third party could edit the URI of a distributor 104, so that user systems 106 are redirected to a different website where malicious content disguised as legitimate content can be downloaded to the user systems 106, or alter the content provided in the URI. The malicious third party could also serve different content than requested by the user system 106 or serve different content or different versions of content to different users. Also, if the distributors 104 are not secure, a malicious third party could hack into the distributors 104 and compromise the content. In some cases, a malicious third party may spoof another website, which is commonly referred to as a "man in the middle attack." As discussed below, the disclosed safe download process is designed to prevent these attacks.

Safe Download Process

Figure 2:
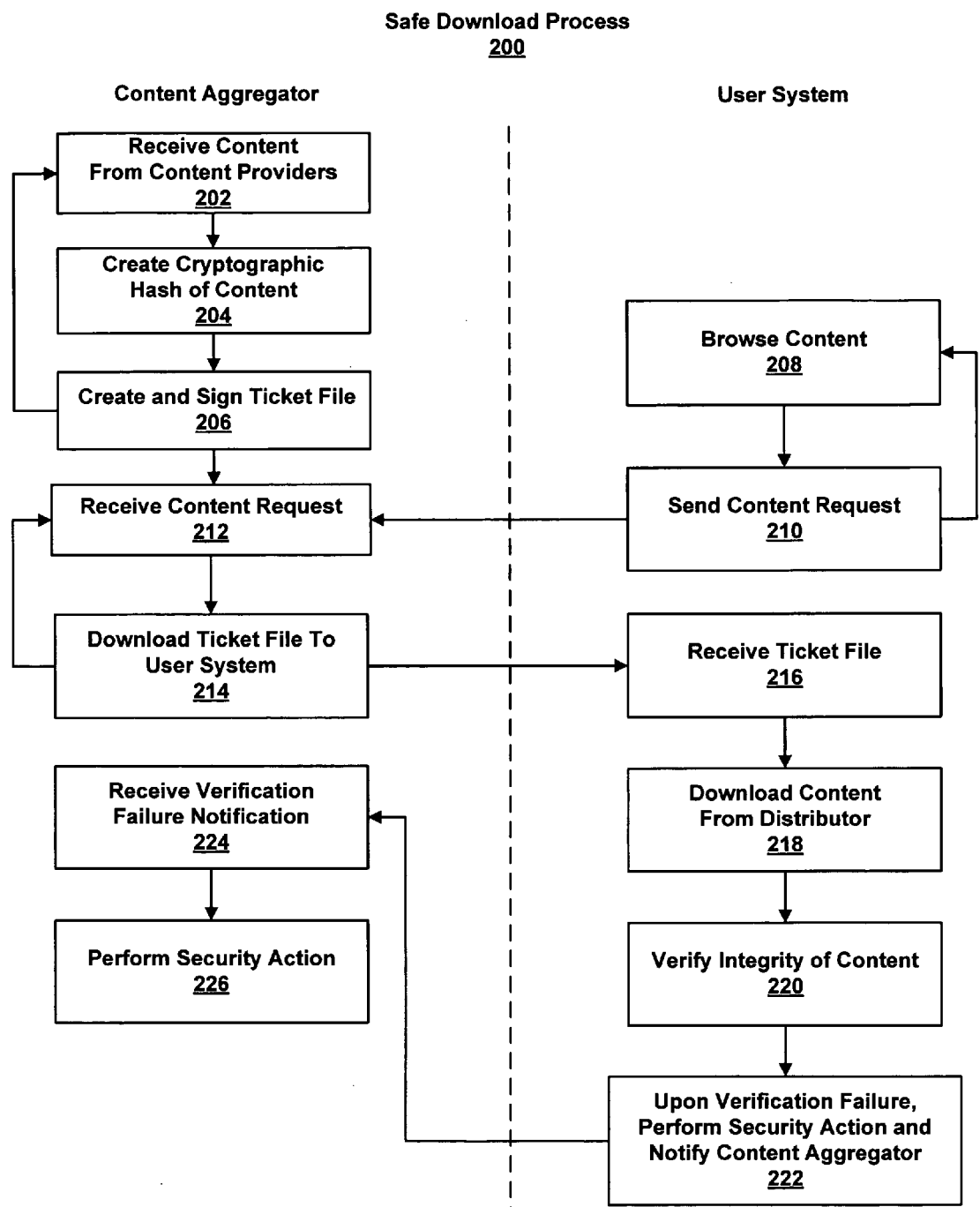
FIG. 2 is a flow diagram of an exemplary safe download process.

FIG. 2 is a flow diagram of an exemplary safe download process 200. The process 200 allows a content aggregator 102 to safely redirect user systems 106 to distributors 104 for downloading content. The steps of process 300 do not have to occur in any particular order, and at least some steps can by executed in parallel in a multithreading or multiprocessing environment. Reference will be made to a content aggregator site and a distribution site, though such reference is made only by way of example. The download process described herein has equal applicability to other content aggregator and distributor variations. The term "download" means any transfer of information between two or more devices and is not restricted to the transfer of information from a website to a device. The term download also includes the transfer of content using a CD ROM, hard disk, Flash drive or other physical medium.

At a content aggregator, content is received from one or more content providers (202). In some implementations, the content can be stored in a repository accessible by the content aggregator site. Storing content enables content inspection at a later date and to generate new hashes. A cryptographic hash of the content to be downloaded is created (204). In some implementations, the cryptographic hash is created using a one-way hash function (e.g., MD5, Secure Hash Algorithm (SHA-1), etc.).

In some implementations, the aggregator combines the cryptographic hash with the URI of a distribution site into a "ticket" file (206). A "ticket file" can be any data structure capable of distributing information, including but not limited to: one or more files, a bit stream, a modulated signal, a radio frequency, a carrier wave, as part of a URI, etc. The ticket file can be digitally signed by the aggregator and made available to user systems for download. The aggregator and/or trusted third party (e.g., a distributor) can cryptographically sign each ticket file. The ticket file can be uncompressed or compressed (e.g., a zip file). A one-way hash function can be used in the creation of the digital signature for the ticket file. The ticket file can also include meta-data, including but not limited to: a hash function type, a public key, content provider information, versioning information, etc. In some implementations, the ticket file can be implemented as a Content Management System (CMS) file with extended information.

In some implementations, a digital certificate can accompany the digital signature to enable the user system to check the authenticity of the ticket file. Digital signatures and certificates are described in several publicly available specifications associated with known standards, including but not limited to: International Telecommunications Union Telecom Standardization (ITU-T) (formerly CCITT) X.509, Public-Key Cryptography Standards (PKCS), Privacy-Enhanced Mail Standard (PEM), Secure Sockets Layer (SSL) protocol, Transport Layer Security (TLS) protocol, etc.

An operator of a user system can browse a repository of content-related information hosted by the content aggregator site (208) and send a content request to the content aggregator site (210). The content request can be made, for example, by clicking on a link, button or other download trigger mechanism associated with the content. In response to receiving a content request (212), the content aggregator site downloads an appropriate ticket file to the user system using, for example, a downloading application (214).

The user system receives the ticket file and extracts the contents, including verifying the digital signature of the ticket file using a public key associated with the content aggregator site and known decryption techniques. In some implementations, the ticket file includes a digital certificate that can be verified against a Certificate Revocation List (CRL) or alternate revocation databases to determine if the ticket file is revoked. In some implementations, in lieu of sending a ticket file, a URI is downloaded to the user system which includes a hash and any other data that could have been sent in the ticket file.

The URI in the ticket file is used by a browser installed on the user system to access the distribution site to download the content. In some implementations, opening the URI causes an application to launch to handle the download. The user system downloads the content from the distribution site (218) and verifies the integrity of the content (220). For example, to verify content integrity, the user system can create a hash of the downloaded content with the same hash function used to create the hash in the ticket file. The two hashes can be compared to see if they match. If the hashes match, the user system can be confident that the downloaded content is the same content that was provided to the content aggregator site by the content provider. If the hashes do not match, the content either originated from a different source or was modified after being encrypted.

Upon a verification failure, the user system can perform one or more security actions (222), including but not limited to: deleting, disabling or quarantining content and issuing warnings. Optionally, the user system can notify the content aggregator site of the verification failure. When the content aggregator site receives the failure notification (224), the content aggregator can perform one or more security actions (226). For example, the content aggregator site can revoke the digital signature of the ticket file, so that the corrupted content cannot be installed or accessed on the user system. Also, the content aggregator site can stop redirecting user systems to the offending distribution site or otherwise disrupt or prevent the download process from occurring (e.g., cause a download failure). In some implementations, the content aggregator site stores and maintains a Certificate Revocation List (CRL). The list enumerates revoked certificates along with the reason(s) for revocation. The dates of certificate issue, and the entities that issued them can also be included. When a user system attempts to verify the signature of a ticket file or of content, the CRL can be checked to determine if the signature has been revoked, and can initiate a security action based on the CRL entry for that particular user system. CRLs can be distributed in one of two ways. In a "pull" model, user systems download the CRL from the content aggregator site, as needed. In a "push" model, the content aggregator site sends the CRL to the users systems at regular intervals. In some implementations, a hybrid approach can be used where the CRL is pushed to several intermediate repositories from which the user systems can retrieve the entries as needed.

The content aggregator site can optionally store and maintain one or more "black" lists associated with rogue content. If a user system attempts to download, install or launch content that is on the "black" list, then the content aggregator system can initiate a security action that prevents the content from being downloaded, installed or launched from a distribution site. There can also be one or more "white" lists associated with verified content optionally stored and maintained at the content aggregator site. If a user system attempts to download, install or launch content that is not on the "white" list, then the content aggregator system can initiate a security action that prevents the content from being downloaded, installed or launched from a distribution site.

In some implementations, the ticket file can be securely stored in a database at the user system to assist users in redownloading content from the distributor. The database can be stored in a location where it cannot be modified directly by a user. One or more access levels to the database can be restricted to a system administrator, superuser or a special role account. The database format can be selected to provide control of read and write access to ticket files in the database. To prevent malicious modifications, the database can be signed by a private key associated with the user system. An exemplary database can store relative paths to content, hashes of ticket files, content identifiers and any other desired information (e.g., revocation data).

In some implementations, content is downloaded as individual content segments which can be individually signed. The user system can verify each content segment as it is downloaded from the distribution site to detect failures before the entire download of content is completed. Content segment information (e.g., segment signatures) can be included in the ticket file for this purpose.

In some implementations, digital signatures can be embedded in the content itself for added security. The signatures can be generated by content providers, content aggregator sites or any other entity in the content distribution chain.

Safe Download of Widgets

Widgets are one example of content that can be downloaded using the systems and methods described with respect to FIGS. 1-2. Widgets can reside on user interfaces (e.g., a desktop, an application window, etc.) or in a special layer referred to as a "dashboard layer." Widgets and dashboard layers are described in co-pending U.S. patent application Ser. No. 10/877,968, for "Unified Interest Layer For User Interface." Although the description that follows is focused on widgets, the implementations described are equally applicable to any content, including but not limited to applications, documents, files, video, music, software, etc.

Figure 3A:
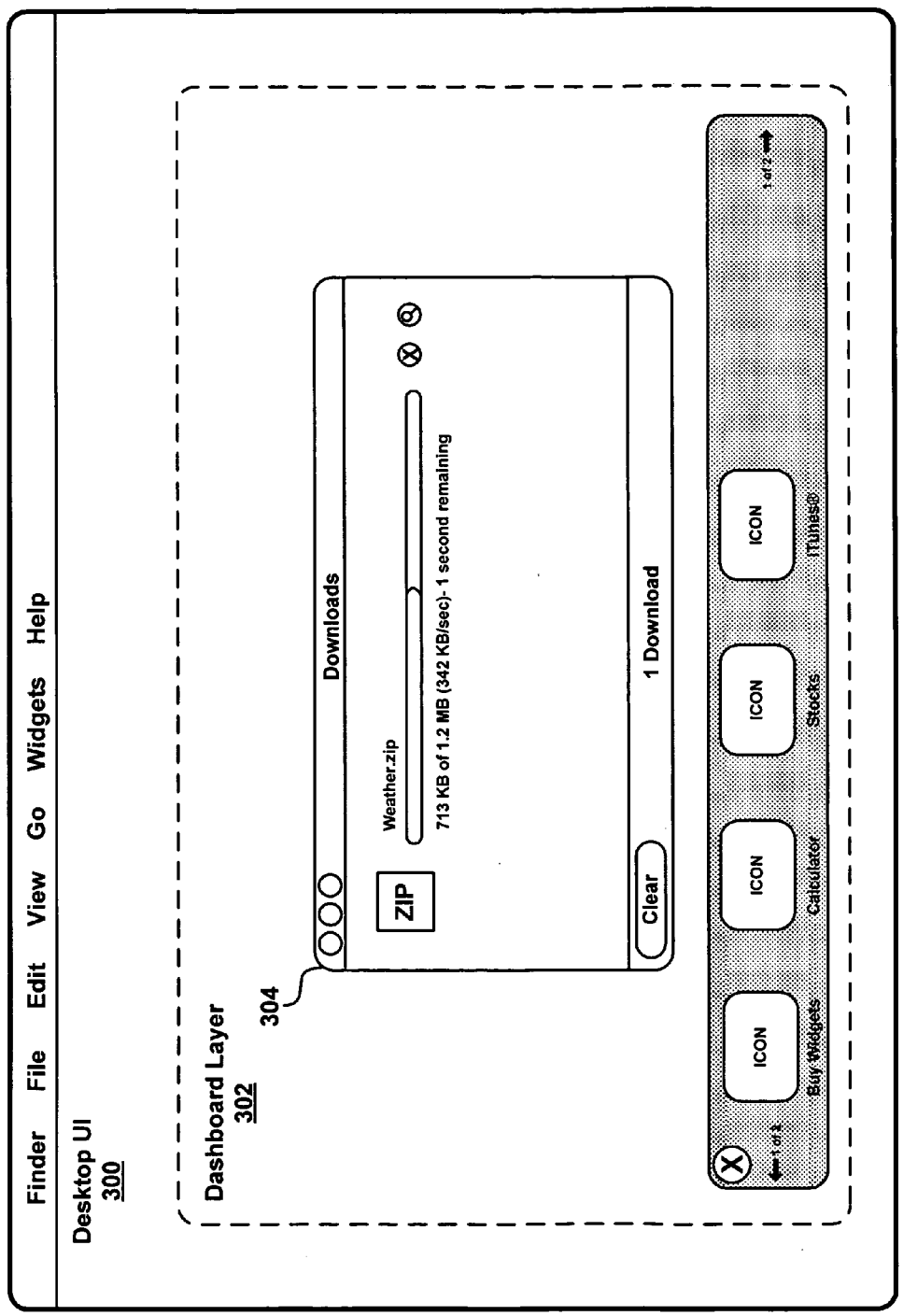
FIG. 3A illustrates an exemplary dialog pane for a downloading application.

FIG. 3A illustrates an exemplary dialog pane 304 for a downloading application. When a user requests a widget download, a downloading application (e.g., a browser) downloads a ticket file from the aggregator site to the user system 106. The ticket file can include one or more hashes of the widget files to be downloaded from the distributor 108. In some implementations, a hash is generated for all the widget files that will be part of the download from the distributor 104, including any directory structures and metadata. The hash can be used to authenticate the widget files. For example, a downloading application can generate a hash of the downloaded widget files using the same hash function (e.g., SHA-1) that was used by the aggregator 102 to generate the hashes received in the ticket file. The hashes are then compared with the hashes received in the ticket file. In some implementations, the hashes are compared during download to enable the download process to be terminated before the download process completes. If the hashes match, the user can proceed with installation of the widget files. If the hashes do not match, the downloading application can terminate the download process and display a dialog pane warning the user that the download has failed. Additionally, a download failure can invoke other security actions on the user system, including but not limited to scanning the user system for revoked widgets, starting an anti-virus application, etc.

Figure 3B:
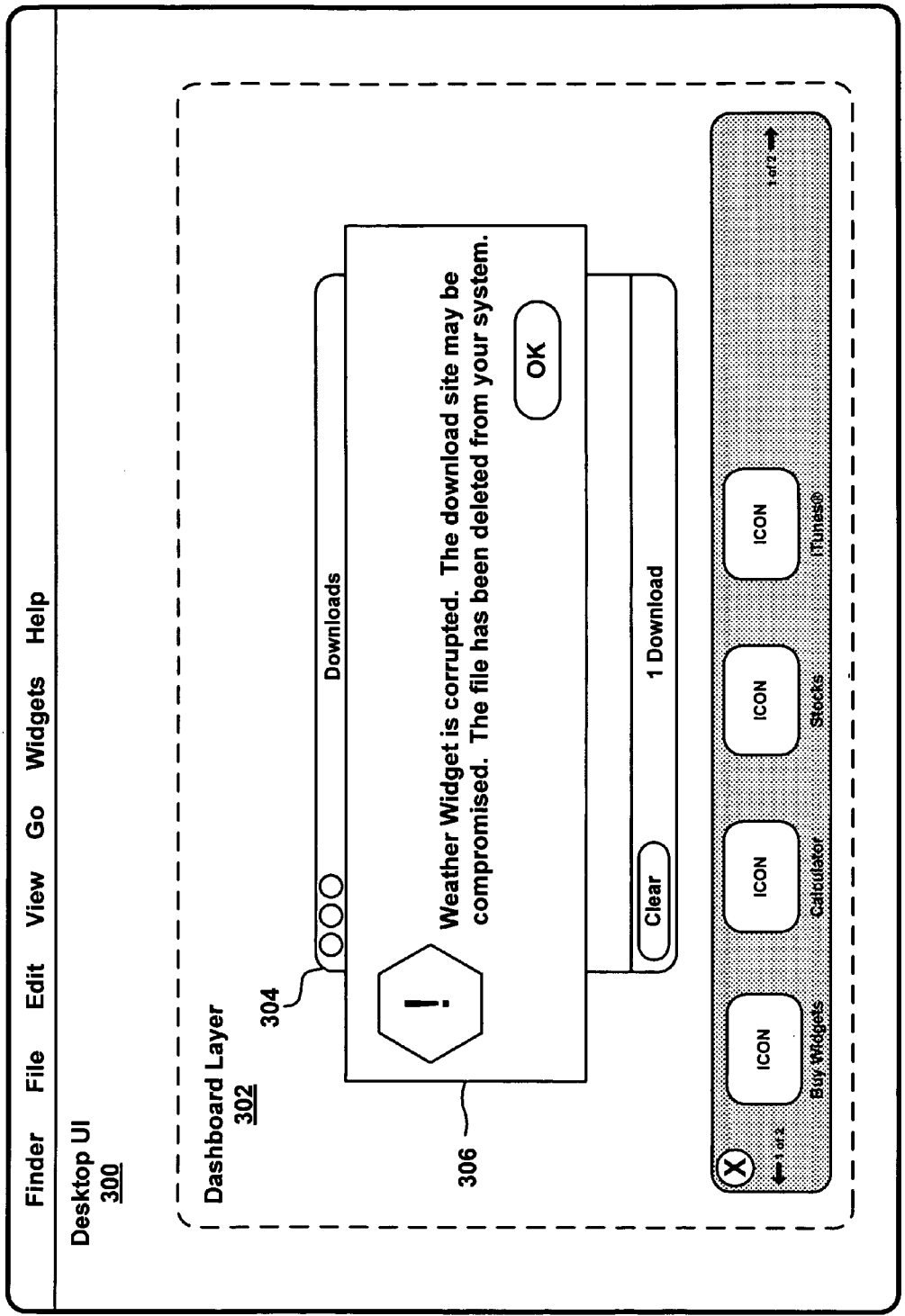
FIG. 3B illustrates an exemplary dialog pane warning users when a widget has been compromised.

FIG. 3B illustrates an exemplary dialog pane 306 warning the user that the download has failed and the widget file was deleted from the system. Other dialogs are possible. For example, the user can be provided with an option to delete the file from the user system or to ignore the warning and continue with the download.

Upon failure of a download of widget files, the aggregator 102 can initiate one or more actions, including notifying the distributor 104 of the failure and requesting another copy of the widget files so that a new ticket file can be generated by the aggregator 102. Alternatively, the aggregator 102 can cease redirecting user systems 106 to the distributor 104 until the reasons for the download failure are addressed.

Safe Installation of Widgets

Figure 4:
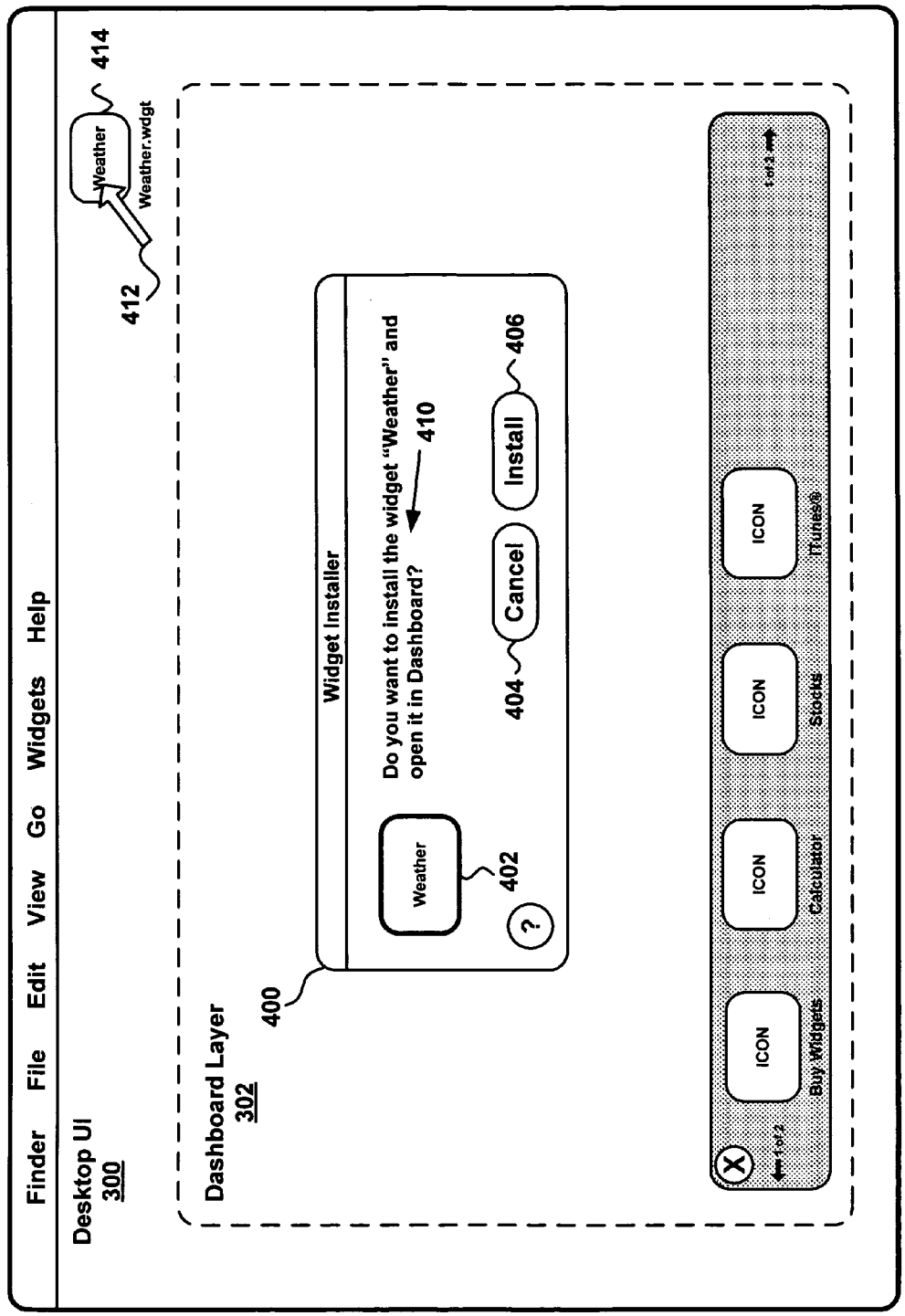
FIG. 4 is a flow diagram of an exemplary widget installer which provides for safe installation of widgets.

FIG. 4 is a user interface associated with an exemplary widget installer which can implement the methods described above with respect to FIG. 2. The widget installer can be used to provide a safe environment for installing widget files that were successfully downloaded from a distributor 104 (i.e., the ticket file hash matched the hash generated from the downloaded widget files).

In the example shown, a user system 106 has downloaded a "Weather" widget from a distributor 104 and an installation icon 316 associated with the "Weather" widget is displayed on a desktop UI 300. A ticket file containing a cryptographic hash of the "Weather" widget was previously downloaded from the content aggregator site 102 and successfully verified. The operator of the user system 106 can click on the "Weather" widget icon 414 with a mouse cursor 412 or other pointing device to initiate installation of the "Weather" widget into the dashboard layer 302. When the user clicks the "Weather" widget icon 414, a widget installation window 400 is presented on the desktop UI 300. The installation window 400 can include a confirmation message 410 and cancel and install buttons 404 and 406. An image 402 of the "Weather" widget can also be displayed in the installation window 400.

Figure 5:
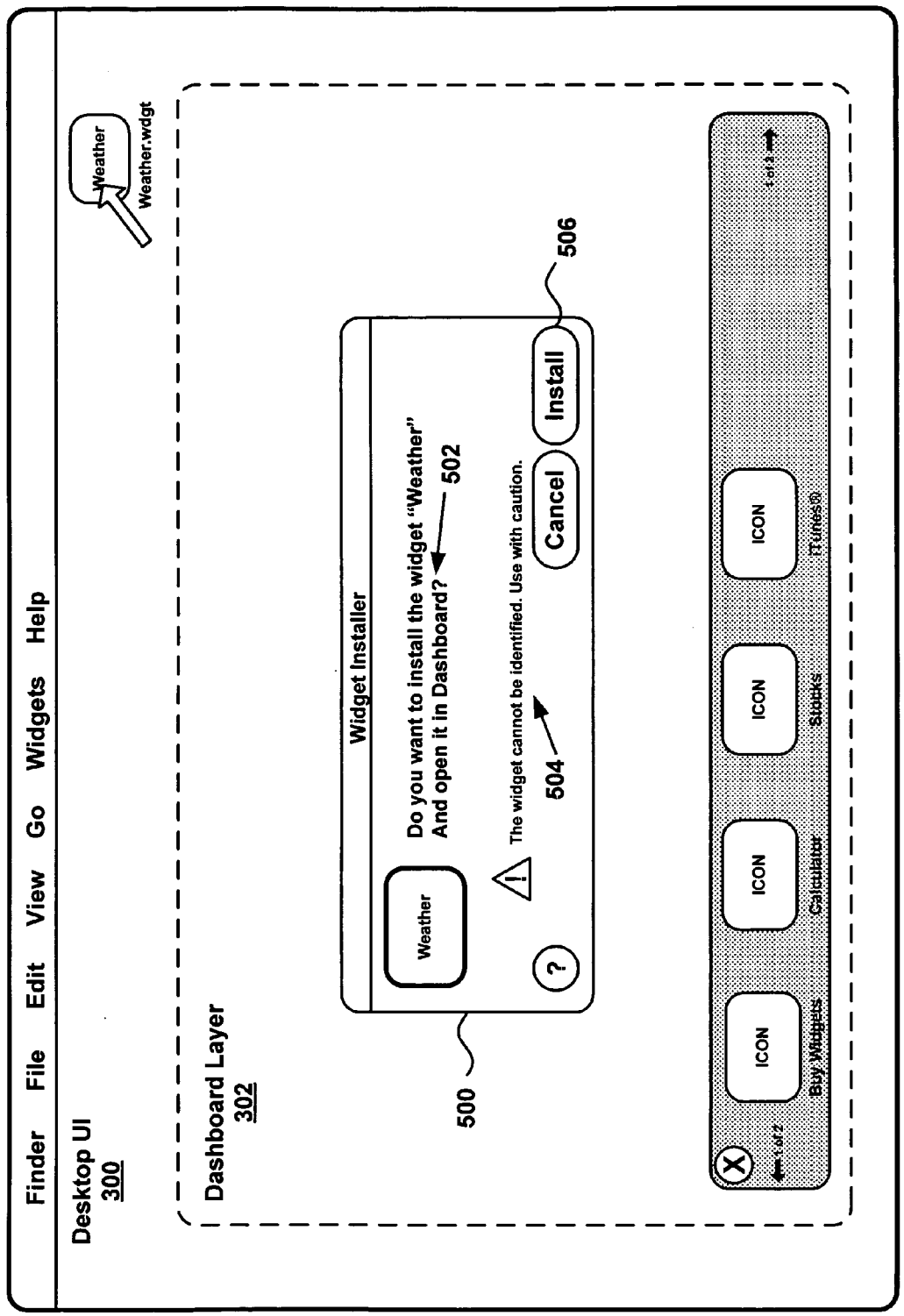
FIG. 5 illustrates an exemplary dialog pane warning users when a widget cannot be identified.

In some implementations, a widget includes a signed manifest that contains a cryptographic hash for each file associated with the widget. The manifest can be signed in the same manner as the ticket file associated with the widget. In response to the install button 406 being clicked or selected, a security engine 1326 (see FIG. 13) in the user system 106 generates hashes of the "Weather" widget files using the same hash function (e.g., SHA-1) that was used to generate the hashes in the manifest. The hashes are then compared with the hashes received in the manifest. If the hashes match, the "Weather" widget can be installed. If the hashes do not match, the security engine 1326 can display a dialog pane 500 warning the user that the "Weather" widget cannot be identified and to proceed with caution, as shown in FIG. 5. Other dialogs are possible. In some implementations, no dialog pane is presented and the user system automatically deletes the file and informs the user of the deletion.

In some implementations, widgets that are downloaded are stored in a widget database that is immutable for a class of users. Widgets can be stored separately from their manifests, and the manifests can be stored anywhere on the user system 106 or on a different device (e.g., a network device). Storing the widgets in the widget database allows the widgets to be locally signed or resigned by the user or the user system 106. For example, a widget installer, which has access to a private key can sign widgets locally.

In some implementations, the security engine 1326 automatically deletes the "Weather" widget from the user system 106. In some implementations, a notification can be sent to the content aggregator site 102, so that security actions can be initiated by the content aggregator site 102. For example, the content aggregator site 102 can stop redirecting user systems to the offending distribution site 104 and/or alert operators of the user systems 106 of the security problem when the user systems 106 attempt to download content.

FIG. 5 illustrates an exemplary dialog pane 504 warning users that a "Weather" widget cannot be identified (i.e., the widget does not have a signature file/representation) and to proceed with caution. In this example, an unsigned "Weather" widget was downloaded from a distribution site 104 to a user system 106 without a ticket file. Upon successful completion of the download process, an installation window 500 is presented for installing the unsigned "Weather" widget into a dashboard layer 302. The security engine 1326 attempts to verify the digital signature of the "Weather" widget, as described with respect to FIG. 2. Since there is no digital signature to verify, the security engine 1326 can display the dialog pane 504 in the installation window 500, warning the operator that the widget could not be identified (i.e., no digital signature), and advising the operator to proceed with caution. Having been warned, the operator can proceed to install the "Weather" widget by clicking the install button 506. An advantage to this download process is the user system 106 can install both signed and unsigned widgets. In some implementations, the dialog pane 505 can be displayed if the security engine 1326 is unable to access a revocation list, as described with respect to FIGS. 11 and 12.

Figure 6:
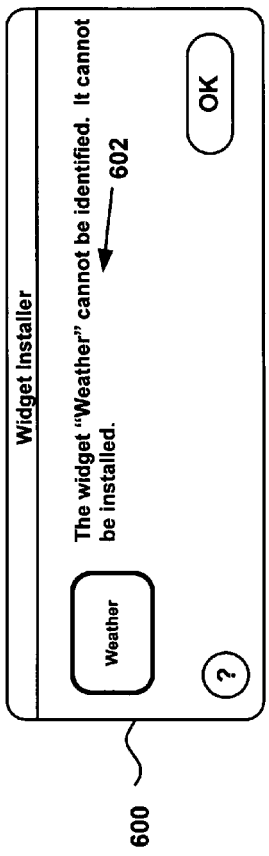
FIGS. 6-8 illustrates exemplary dialog panes for various security scenarios related to digitally signed widgets.
Figure 7:
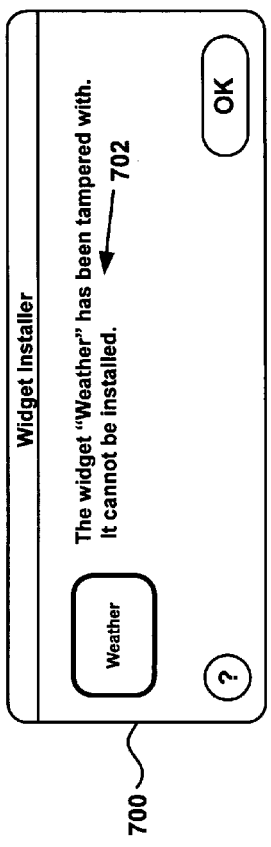
Figure 8:
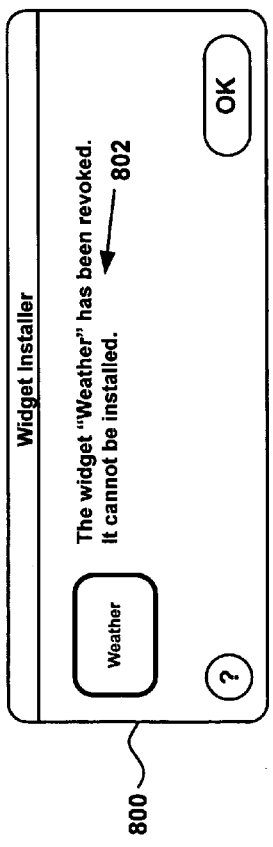

FIGS. 6-8 illustrate dialog panes 600, 700 and 800, for various security scenarios related to digitally signed widgets. If the user system 106 is configured to only-allow the installation of signed widgets (e.g., by a system administrator), the dialog pane 602 can be displayed in the installation window 600 in response to attempt to install an unsigned widget. A message such as "The widget 'Weather' cannot be identified. It cannot be installed" or similar warning can be displayed. Note that an install button is not available in the installation window 600 to prevent installation of unsigned widgets. If an attempt is made to install a signed widget, but the signed widget fails verification (e.g., by comparison with a hash in the widget's manifest), then a dialog pane 702 can be displayed in the installation window 700. A message such as "The widget 'Weather' has been tampered with. It cannot be installed," or similar warning can be displayed. As in FIG. 6, there is no install button to prevent installation of a corrupted "Weather" widget. If the "Weather" widget is signed, but has been previously revoked, then a dialog pane 802 can be displayed in the installation window 800. A message such as "The widget 'Weather' has been revoked. It cannot be installed," or similar warning can be displayed. As in FIGS. 6 and 7, there is no install button to prevent installation of the revoked "Weather" widget.

Safe Management of Installed Widgets

Figure 9:
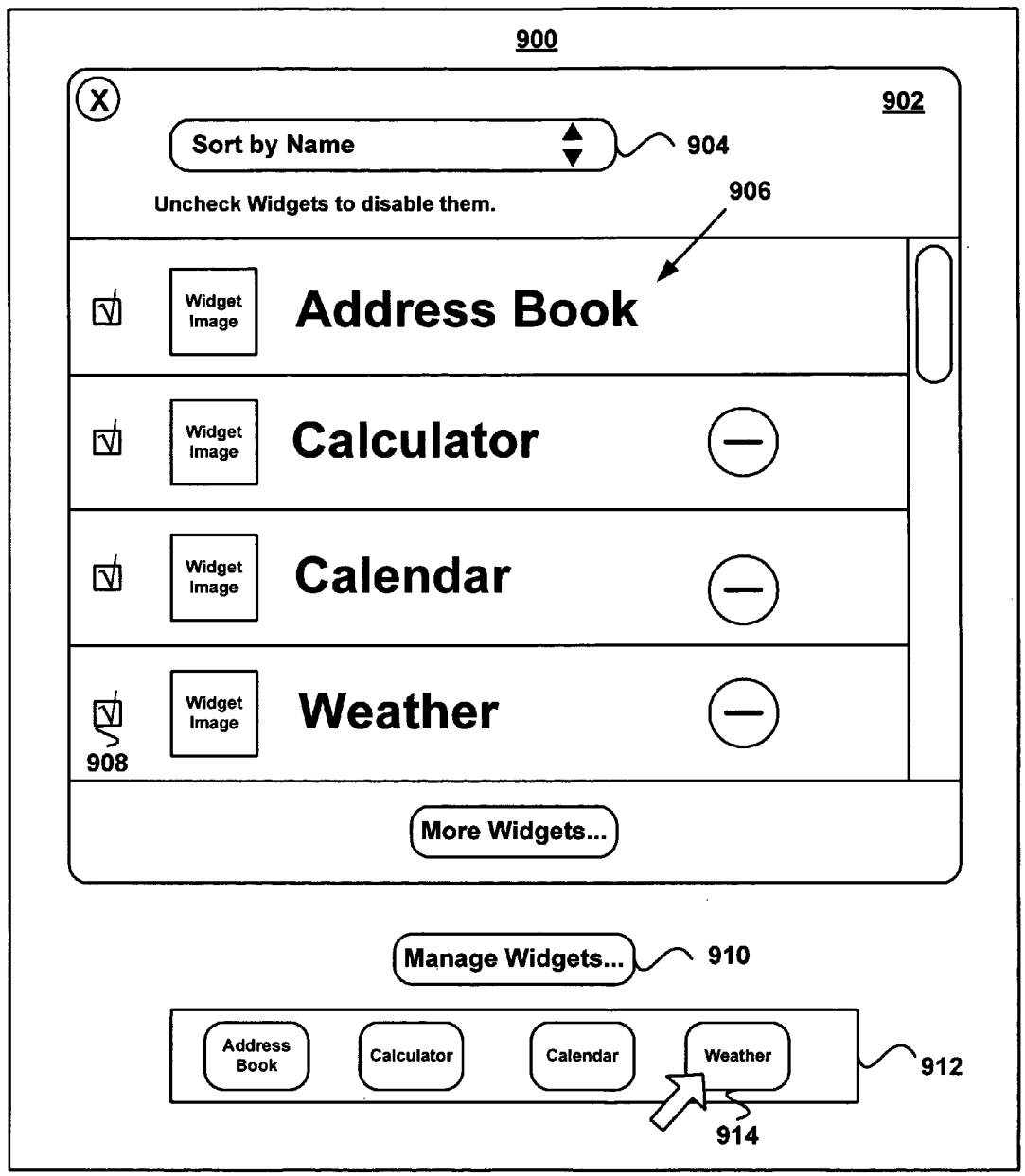
FIG. 9 illustrates an exemplary widget manager which provides for safe management of installed widgets.

FIG. 9 illustrates an exemplary widget manager 902 which provides for safe management of installed widgets. In some implementations, the widget manager 900 can be launched from within a UI 900 or dashboard layer by clicking a button 910 located in the UI 900. Other methods and mechanisms for launching the widget manager 902 are possible. An exemplary widget manager 902 is described in co-pending U.S. Provisional patent application No. 60/737,899, for "Management of User Interface Elements In A Display Environment."

When the widget manager 900 is launched a list 906 of installed widgets is displayed. The widgets can be sorted according to various sorting criteria, which can be selected from menu 904. Each widget in the list 906 can have an associated checkbox 908 that can be checked or unchecked to enable or disable a widget, respectively. Widgets can be launched by clicking on an icon 914 associated with the widget located on a configuration bar 912. Other methods and mechanisms for launching widgets are possible.

It is possible for a signed widget to pass download and installation security verifications, but then become corrupted or revoked while running or residing on a user system 106. Accordingly, the security engine 1326 can periodically verify the hash or signature of a widget to determine if that widget poses a security risk. The verification can be performed in response to a schedule or a trigger event (e.g., an unauthorized content access attempt or other actions taken by a widget, boot-up or wake-up of the user system, the receipt or generation of new revocation data, etc.). The verification can include checking for signatures that may have been removed and/or creating another hash of the widget and comparing it against the hash received in a manifest. The verification can also check one or more revocation lists to determine if the signature for a ticket file (or a widget) has been revoked.

In some implementations, there can be at least two revocation lists: a primary list and a secondary list. The revocation lists can be downloaded from the content aggregator site 102, or other trusted source, and stored at the user system 106. The lists can be downloaded periodically from the content aggregator site 102, or in response to a trigger event (e.g., widget download or installation, etc.). An exemplary primary revocation list can be a CRL for digital certificates that can been distributed with the widget. An exemplary secondary revocation list can be used to revoke widgets based on other constraints. The exemplary secondary revocation list can include key-value pairs. The keys can be known strings existing in extended information of digital certificates, calculable hashes of widgets, etc. Values can be a list of regular expressions used in known open source programming languages, such as PERL®. Note that any type of language can be used, including proprietary languages.

In some implementations, an Online Certificate Status Protocol (OCSP) can be used to check the status of certificates in real time. In some implementations, security can be enhanced by digitally signing the secondary revocation list.

Figure 10:
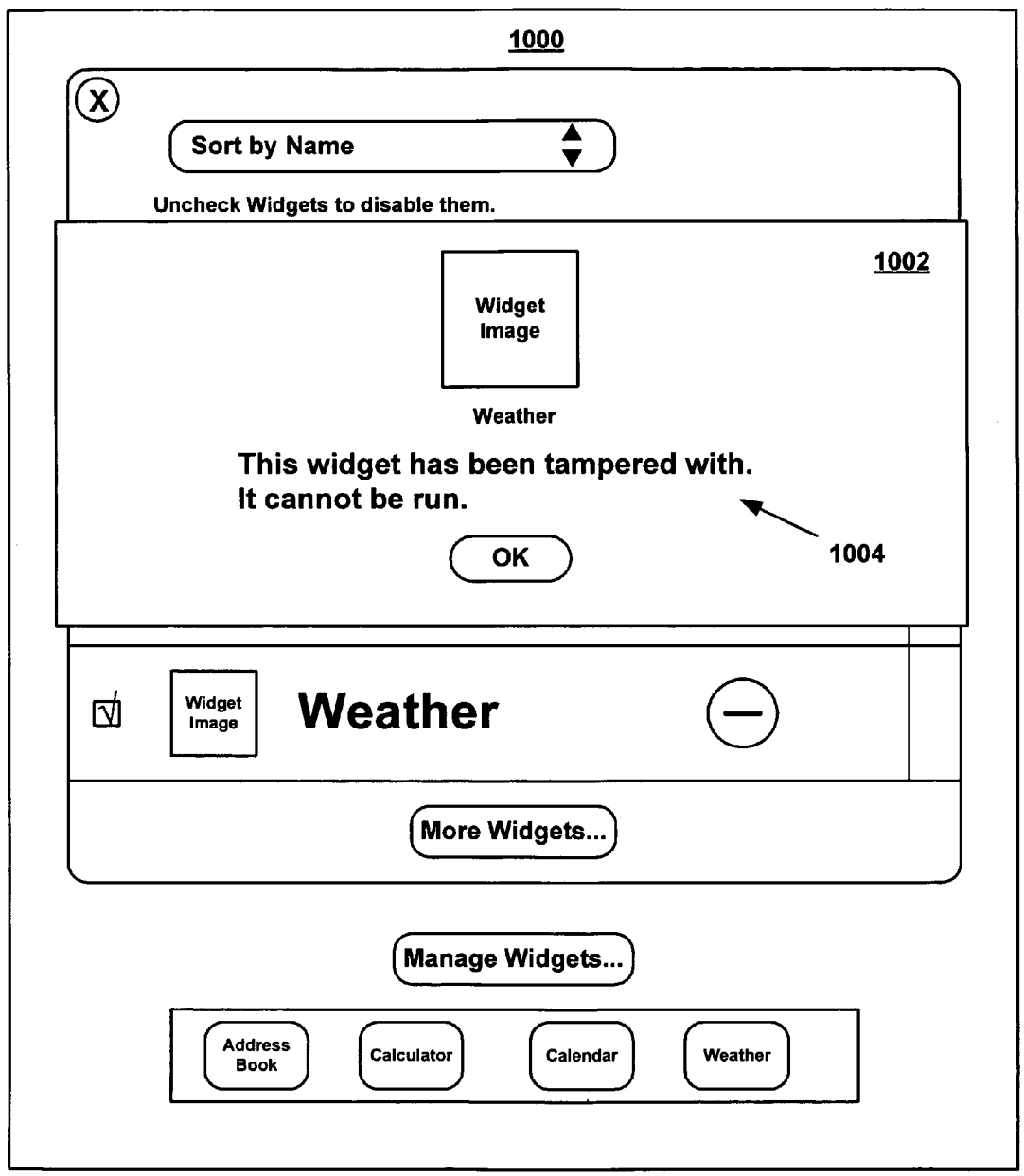
FIG. 10 illustrates an exemplary dialog pane warning users when an installed widget has been compromised.

FIG. 10 illustrates an exemplary dialog pane 1002 for warning an operator of a user system 106 that an installed widget has been compromised. The alert dialog pane 1002 can be displayed, for example, when the operator attempts to launch a widget. In response to an attempt to launch a widget, the security engine 13260 generates a new hash for the widget and compares the new hash with the hash received in a manifest or other file. If the hashes are different, then the widget may have been compromised while it was installed on the user system 106. An exemplary message 1004 could be "This widget has been tampered with. It cannot run." Other messages are possible.

Figure 11:
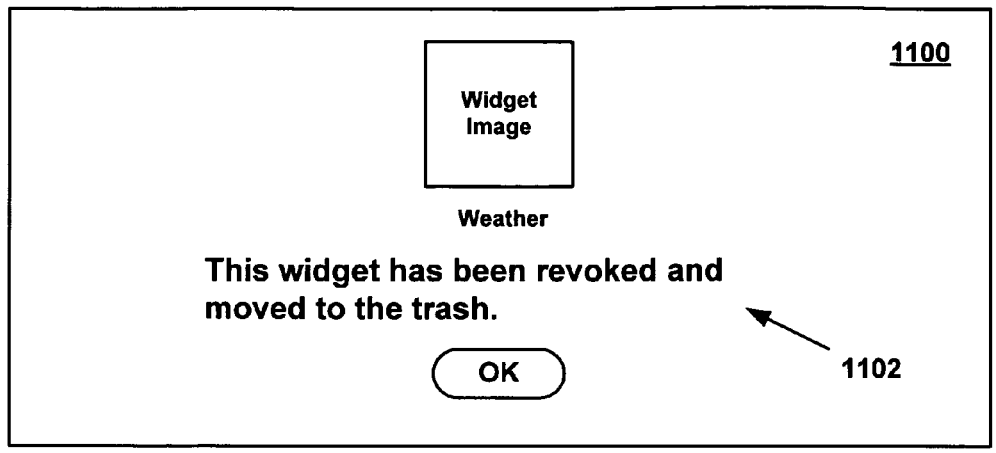
FIGS. 11 and 12 illustrate exemplary dialog pane for various security scenarios related to widget revocation.
Figure 12:
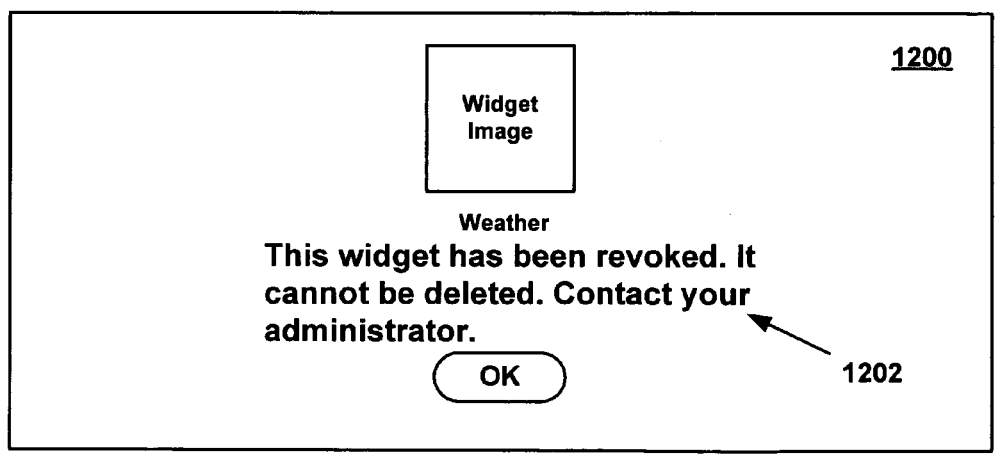

FIGS. 11 and 12 illustrate exemplary dialog panes 1100 and 1200 for various security scenarios related to widget revocation. Periodically or in response to a trigger event, the revocation status of installed widgets can be verified against one or more revocation lists stored at the user system 106 (e.g., primary and secondary revocation lists). If the widget has been revoked, then a dialog pane 1100 can be displayed and the widget can be automatically disabled or removed from the user system 106 (e.g., deleted or placed in the trash, etc.). The dialog pane 1100 can include an appropriate message 1102, such as "This widget has been revoked and moved to the trash." Other messages are possible. If the widget cannot be deleted or removed, then an appropriate message can be "This widget has been revoked. It cannot be deleted. Contact your administrator," as shown in FIG. 12. In the latter case, the widget may not be removed without administrative privileges. In such a case, the operator of the user system 106 can be prompted for an administrator password to perform the deletion or removal of the offending widget from the user system.

In some implementations, the user is provided with an option to revoke the widget. In such a case, the user can be provided with a dialog pane that recommends that the widget be revoked but includes appropriate buttons for accepting or denying the revocation. In some implementations, the ability to revoke a widget is based on privileges, and only users with revocation privileges will be provided with the option to deny a revocation action.

In some implementations, when a revocation event occurs the user system 106 starts a scanning process to look for all instances of the widget that are currently running, so that each instance can be revoked and optionally deleted from the user system 106. This feature can help protect against viral attacks where a rogue widget has duplicated itself on the user system 106.

In some implementations, a security log of installed widgets is stored and maintained on the user system 106. Generally, the security log includes current and historical states of widgets and other applications and software on the user system, including information regarding installation, launching, running, operation, instantiation or any other widget state, activity or event. The security log can be compared against a revocation database to determine if a revoked widget had ever been installed on the user system 106. Thus, the security log keeps track of widgets that were previously installed and deleted from the user system 106. If a previously installed but currently deleted widget is detected, then the user can be provided with instructions on how to clean-up the user system 106 or anti-viral software can be invoked to detect and isolate or delete multiple instances of a revoked widget. This feature is useful for detecting files or programs that remain on the user system 106 that could potentially spawn new rogue widgets, corrupt data or programs, or pose other security risks. In some implementations, the security log can be protected by access privileges that can be changed by a system administrator or any other individual or entity that has control over granting or changing privileges.

Sandboxed Widgets

In some implementations, the capabilities of some widgets can be restricted to improve security at the user system 106. One or more of the following restrictions can be implemented: 1) restrict widget access to network contents (e.g., access to a single site only); 2) disable cookies associated with widgets; 3) prevent widgets from initiating HTTP POST transactions; 4) restrict widgets from SSL access (e.g., use only HTTP); 5) prevent widgets from loading network contents using FRAME, IFRAME, OBJECT or similar constructs (e.g., XMLHttpRequest can be used for simple data access); 6) rate-limit the number of network requests made by widgets to a maximum number per minute and/or per hour; and 7) do not allow widgets to initiate redirects to other servers or other protocols (e.g., https). Widgets that are made to comply with one or more of these restrictions are hereinafter referred to as "sandboxed" widgets. In some implementations, operators of user systems 106 and/or system administrators can configure these restrictions as desired.

Sandboxed Versus Signing

In some implementations, a user system 106 can have widgets that operate outside the "sandbox" that are digitally signed. Additionally, a "sandbox" can be defined for one or more signed widgets or for all unsigned widgets. The user system 106 can also apply a "sandboxed" role to one or more specific downloads. Different warnings can be provided to operators of user systems 106 based on the type of widget security that is employed. Exemplary warnings are summarized in Table I below. Other warnings are possible.

TABLE I

| Exemplary Security Warnings | | |
|---|---|---|
| Restrictions | Signed | Unsigned |
| Sandboxed | No warnings | Multiple warnings plus keep/delete option on download/first launch |
| Not Sandboxed | No warnings | No warning; straight to keep/delete option<br>Multiple warnings plus keep/delete option on download/first launch<br>Multiple warnings before keep/delete option<br>Refuse to run |

Referring to Table I, if the widget is signed then one option is not to issue any warnings. If the widget is unsigned and sandboxed, then one option is to provide the operator of the user system 106 with the capability to either keep or delete the widget (e.g., a dialog pane with keep/delete buttons). The keep/delete option can be presented with or without warning(s). If the widgets are neither signed nor sandboxed, then warnings can be provided with a keep/delete option or issued before a keep/delete option, or the user system 106 can refuse to run the widgets.

User System Hardware Architecture

Figure 13:
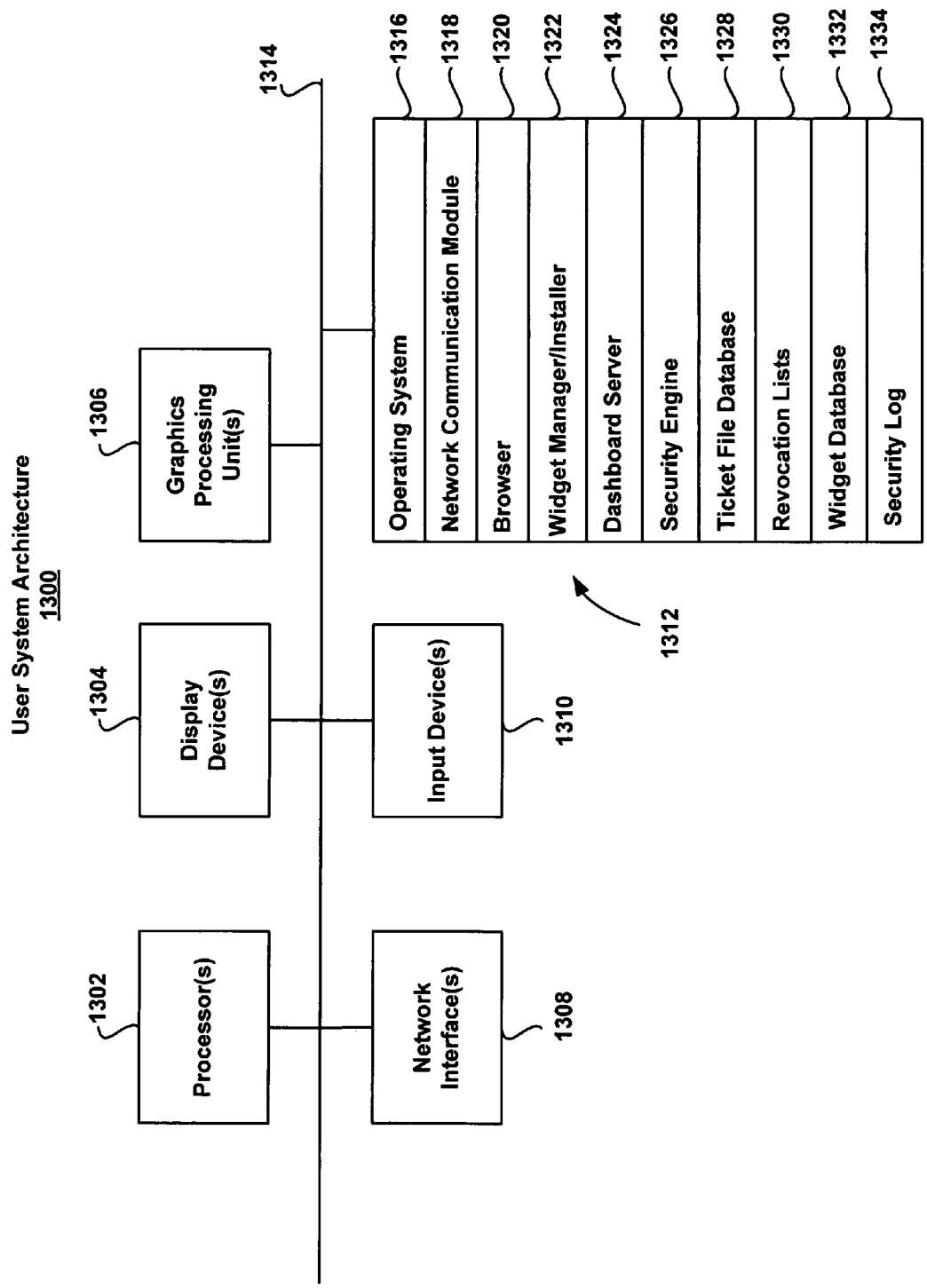
FIG. 13 is a block diagram of an exemplary hardware architecture for a user system.

FIG. 13 is a block diagram of an exemplary hardware architecture 1300 for a user system 106. The user system can be a desktop or portable computer or any other electronic device, including without limitation: a media player/recorder, a television set-top box, a mobile phone, a game console, a PDA or other handheld device, etc. Some of these user systems may implement a modified architecture using a combination of hardware and software.

The architecture 1300 includes one or more processors 1302 (e.g., PowerPC®, Intel Pentium® 4, etc.), one or more display devices 1304 (e.g., CRT, LCD), one or more graphics processing units 1306 (GPUs), one or more network interfaces 1308 (e.g., Ethernet, FireWire®, USB, etc.), input devices 1310 (e.g., keyboard, mouse, etc.), and one or more computer-readable mediums 1312 (e.g., RAM, ROM, SDRAM, hard disk, optical disk, flash memory, L1 and L2 cache, etc.). These components can exchange communications and data via one or more buses 1314 (e.g., EISA, PCI, PCI Express, etc.).

The term "computer-readable medium" refers to any medium that participates in providing instructions to a processor 1302 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium 1312 further includes an operating system 1316 (e.g., Mac OS®, Windows®, Linux, etc.), an optional network communication module 1318, a browser 1320 (e.g., Microsoft® Internet Explorer, Netscape®, Safari®, etc.), a widget manager/installer 1322, an optional dashboard server 1324, a security engine 1326, a ticket file database 1328, one or more revocation lists 1330, a widget database 1332 and a security log 1334.

The operating system 1316 can be multi-user, multiprocessing, multitasking, multithreading, real-time and the like. The operating system 1316 performs basic tasks, including but not limited to: recognizing input from input devices 1310; sending output to display devices 1304; keeping track of files and directories on computer-readable mediums 1312 (e.g., memory or a storage device); controlling peripheral devices (e.g., disk drives, printers, GPUs, etc.); and managing traffic on the one or more buses 1314.

The network communications module 1318 includes various components for establishing and maintaining network connections (e.g., software for implementing communication protocols, such as TCP/IP, HTTP, Ethernet, etc.). The browser 1320 enables operators of the user system 106 to search a network (e.g., Internet) for content. The widget manager/installer 1322 manages and installs widgets, as described with respect to FIGS. 9-12.

The security engine 1326 includes various software components for performing the various functions for safe distribution and use of content, as described with respect to FIG. 2. The ticket file database 1328 and revocation lists 1330 were described with respect to FIGS. 2, 11 and 12.

Content Aggregator System Hardware Architecture

Figure 14:
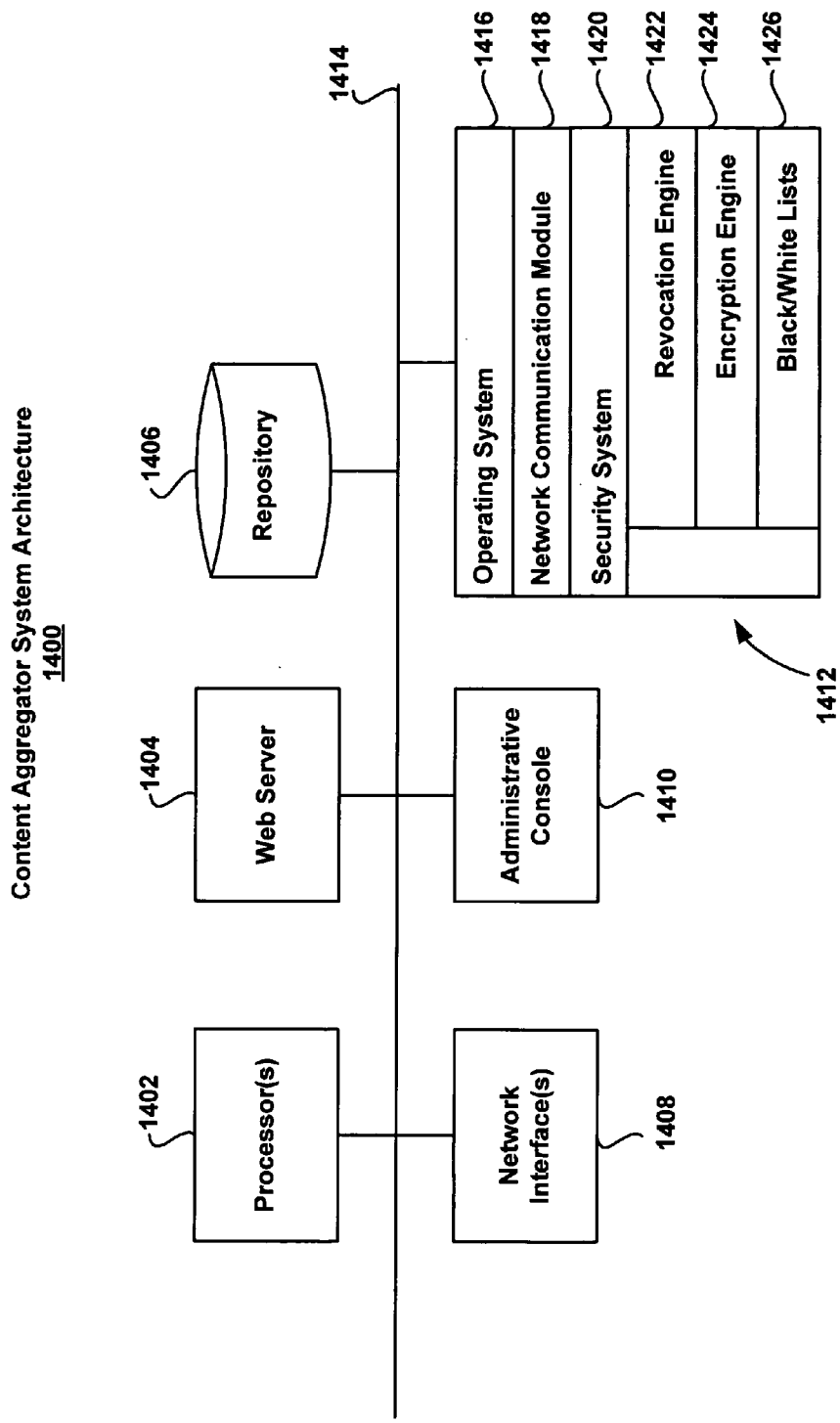
FIG. 14 is a block diagram of an exemplary hardware architecture for a content aggregator system.

FIG. 14 is a block diagram of an exemplary hardware architecture 1400 for a content aggregator system 102. The architecture 1400 includes one or more processors 1402, a web server 1404 a repository 1406, network interfaces 1408, administrative console 1410 and one or more computer-readable mediums 1412. Each of these components can exchange communications and data with other components over one or more buses 1414.

The web server 1404 serves web pages to user systems 106. For example, the web server 1404 can serve a web page to a user system 106 that includes the user interface 300. The administrative console 1410 enables a system administrator to manage various administrative tasks associated with a content aggregator site, such as managing content, user accounts, profiles, etc. The repository 1406 stores content, ticket files, encryption data and other information related to security (e.g., key-value pairs, passwords, etc.). The network interfaces 1408 enables the content aggregator site to download ticket files to user systems 106 over a network 108 (e.g., the Internet).

The computer-readable mediums 1414 further include an operating system 1416 (Mac OS® Server, Windows® NT, etc.), a network communications module 1418 and a security system 1420. The operating system 1416 and network communications module 1418 operate as previously described with respect to FIG. 13. The security system 1420 includes a revocation engine 1422, an encryption engine 1424 and "black" and "white" lists 1426. The encryption engine 1424 handles tasks related to cryptography and digital signatures and the revocation engine 1422 provides revocation services, as described with respect to FIGS. 1-12.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

In particular, one skilled in the art will recognize that other architectures and graphics environments may be used, and that the present invention can be implemented using graphics tools and products other than those described above. In particular, the client/server approach is merely one example of an architecture for providing the dashboard functionality of the present invention; one skilled in the art will recognize that other, non-client/server approaches can also be used.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method, comprising:
    identifying, by one or more first server computers, a content item;
    creating, by one or more first server computers, a cryptographic hash of at least a portion of the content item;
    storing the content item on one or more content distributors, the one or more content distributors different from the one or more first server computers;
    creating, by one or more first server computers, a ticket file including the cryptographic hash and information relating to downloading the content item from one or more second server computers, the one or more second server computers different from the one or more first server computers;
    receiving, by the one or more first server computers, a request for the content item from a user system;
    distributing, from the one or more first server computers, the ticket file to the user system separate from the content item;
    receiving, by the one or more first server computers, a notification from the user system that a verification of the content item using the cryptographic hash has failed; and
    subsequent to receiving the notification that the verification of the content item using the cryptographic hash has failed, initiating, from the one or more first server computers, a security action against the one or more content distributors in response to the failed verification.

2. The method of claim 1, where creating a ticket file further comprises:
    digitally signing the ticket file.

3. The method of claim 1, where initiating the security action in response to the failed verification includes initiating the security action against at least one of the one or more second server computers.

4. The method of claim 3, where initiating the security action comprises:
    revoking a digital signature of the ticket file;
    storing a digital certificate associated with the ticked file in a certificate revocation list (CRL); and
    pushing the CRL to one or more user systems.

5. The method of claim 3, where initiating the security action comprises:
    preventing one or more user systems from downloading the content item, including preventing redirection of the one or more user systems to the at least one of the one or more second server computers.

6. A non-transitory computer-readable medium having stored thereon instructions which, when executed by one or more first server computers, causes the one or more first server computers to perform operations comprising:
    identifying a content item;
    creating a cryptographic hash of at least a portion of the content item;
    storing the content item on one or more content distributors, the one or more content distributors different from the one or more first server computers;
    creating a ticket file including the cryptographic hash and information relating to downloading the content item from one or more second server computers, the one or more second server computers different from the one or more first server computers;
    receiving, by the one or more first server computers, a request for the content item from a user system;
    distributing, from the one or more first server computers, the ticket file to the user system separate from the content item;
    receiving, by the one or more first server computers, a notification from the user system that a verification of the content item using the cryptographic hash has failed; and
    subsequent to receiving the notification that the verification of the content item using the cryptographic hash has failed, initiating, from the one or more first server computers, a security action against the one or more content distributors in response to the failed verification.

7. The computer-readable medium of claim 6, where creating a ticket file further comprises:
    digitally signing the ticket file.

8. The computer-readable medium of claim 6, where
    initiating the security action in response to the failed verification includes initiating the security action against at least one of the one or more second server computers.

9. The computer-readable medium of claim 8, where initiating the security action comprises:
    revoking a digital signature of the ticket file;
    storing a digital certificate associated with the ticked file in a certificate revocation list (CRL); and
    pushing the CRL to one or more user systems.

10. The computer-readable medium of claim 8, where initiating the security action comprises:
preventing one or more user systems from downloading the content item, including preventing redirection of the one or more user systems to the at least one of the one or more second server computers.

11. A system, comprising:
one or more first server computers configured to perform operations comprising:
identifying a content item;
creating a cryptographic hash of at least a portion of the content item;
storing the content item on one or more content distributors, the one or more content distributors different from the one or more first server computers;
creating a ticket file including the cryptographic hash and a path to the one or more content distributors, the path specifying one or more second server computers from which the content item is to be downloaded, the one or more second server computers different from the one or more first server computers;
distributing, from the one or more first server computers, the ticket file to a user system upon a request to download content;
receiving, by the one or more first server computers and from the user system a verification status, the verification status indicating whether the content downloaded to the user system according to the path included in the ticket file matches the cryptographic hash; and
subsequent to receiving a the verification status that the verification of the content item using the cryptographic hash has failed, initiating a security action from the one or more first server computers against the one or more content distributors based on the verification status.

12. The system of claim 11, where initiating the security action in response to the failed verification includes initiating the security action against at least one of the one or more second server computers.

13. The system of claim 12, where initiating the security action comprises:
revoking a digital signature of the ticket file;
storing a digital certificate associated with the ticked file in a certificate revocation list (CRL); and
pushing the CRL to one or more user systems.

14. The system of claim 12, where initiating the security action comprises:
preventing one or more user systems from downloading the content item, including preventing redirection of the one or more user systems to the at least one of the one or more second server computers.

15. The system of claim 11, where creating a ticket file further comprises:
digitally signing the ticket file.

* * * * *